(12) United States Patent
Catalano

(10) Patent No.: US 12,190,336 B1
(45) Date of Patent: *Jan. 7, 2025

(54) SYSTEM AND METHOD OF AUTOMATED REAL ESTATE ANALYSIS

(71) Applicant: Donald Charles Catalano, Northport, NY (US)

(72) Inventor: Donald Charles Catalano, Northport, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/669,250

(22) Filed: May 20, 2024

Related U.S. Application Data

(63) Continuation-in-part of application No. 18/446,311, filed on Aug. 8, 2023, now Pat. No. 11,989,793, which is a continuation-in-part of application No. 18/068,480, filed on Dec. 19, 2022, now Pat. No. 11,720,986, which is a continuation-in-part of application No. 17/525,874, filed on Nov. 13, 2021, now Pat. No. 11,532,058, which is a continuation-in-part of application No. 17/239,568, filed on Apr. 24, 2021, now Pat. No. 11,182,865.

(60) Provisional application No. 63/014,955, filed on Apr. 24, 2020.

(51) Int. Cl.
| | |
|---|---|
| *G06Q 30/0201* | (2023.01) |
| *G06Q 50/16* | (2012.01) |
| *G06T 19/00* | (2011.01) |

(52) U.S. Cl.
CPC ......... *G06Q 30/0201* (2013.01); *G06Q 50/16* (2013.01); *G06T 19/006* (2013.01)

(58) Field of Classification Search
CPC .................................................. G06Q 30/0643
See application file for complete search history.

(56) References Cited

PUBLICATIONS

Liu, "Summary of ChatGPT/GPT-4 Research and Perspective Towards the Future of Large Language Models", 2023, arXiv:2304.01852.
(Continued)

*Primary Examiner* — Aryan E Weisenfeld
(74) *Attorney, Agent, or Firm* — Stephen E. Zweig

(57) ABSTRACT

Computerized system and method of obtaining and analyzing data on how large numbers of real estate visitors view and interact with real estate property. The system, which may operate during either real-world or virtual real estate tours, may utilize data from either property-associated sensors or user mobile device sensors (e.g., smartphone sensors) to obtain and aggregate visitor position and/or orientation data with respect to various designated locations of interest on the property. This can be used to produce statistics on visitor positions and/or orientations with respect to such locations. The resulting data can be used for various purposes, including as input to LLM AI systems for automated real estate recommendations and information about various real estate features associated with below or above-average visitor interest or approval. Various methods to encourage use, such as self-guided real-world tours, virtual staging, and virtual goods and services, are also discussed.

20 Claims, 25 Drawing Sheets

(56) References Cited

PUBLICATIONS

Xie "Towards AGI in Computer Vision: Lessons Learned from GPT and Large Language Models", 2023, arXiv:2306.08641.
Ploennigs and Berger, "AI Art in Architecture", (2022), arXiv:2212.0939.
Brynnnjolfsson, Li, and Raymond, "Generative AI at Work", National Bureau of Economic Research working paper 31161, Apr. 2023, downloaded from https://www.nber.org/papers/w31161.
Feuerriegal, Hartman, Janiesch, and Zscheh, "Generative AI" Bus Inf Syst Eng 66(1):111-126 (Sep. 12, 2023).
Epstein et al., "Art and the science of generative AI: A deeper dive", arXiv:2306.04141v1 [cs.AI] Jun. 7, 2023.

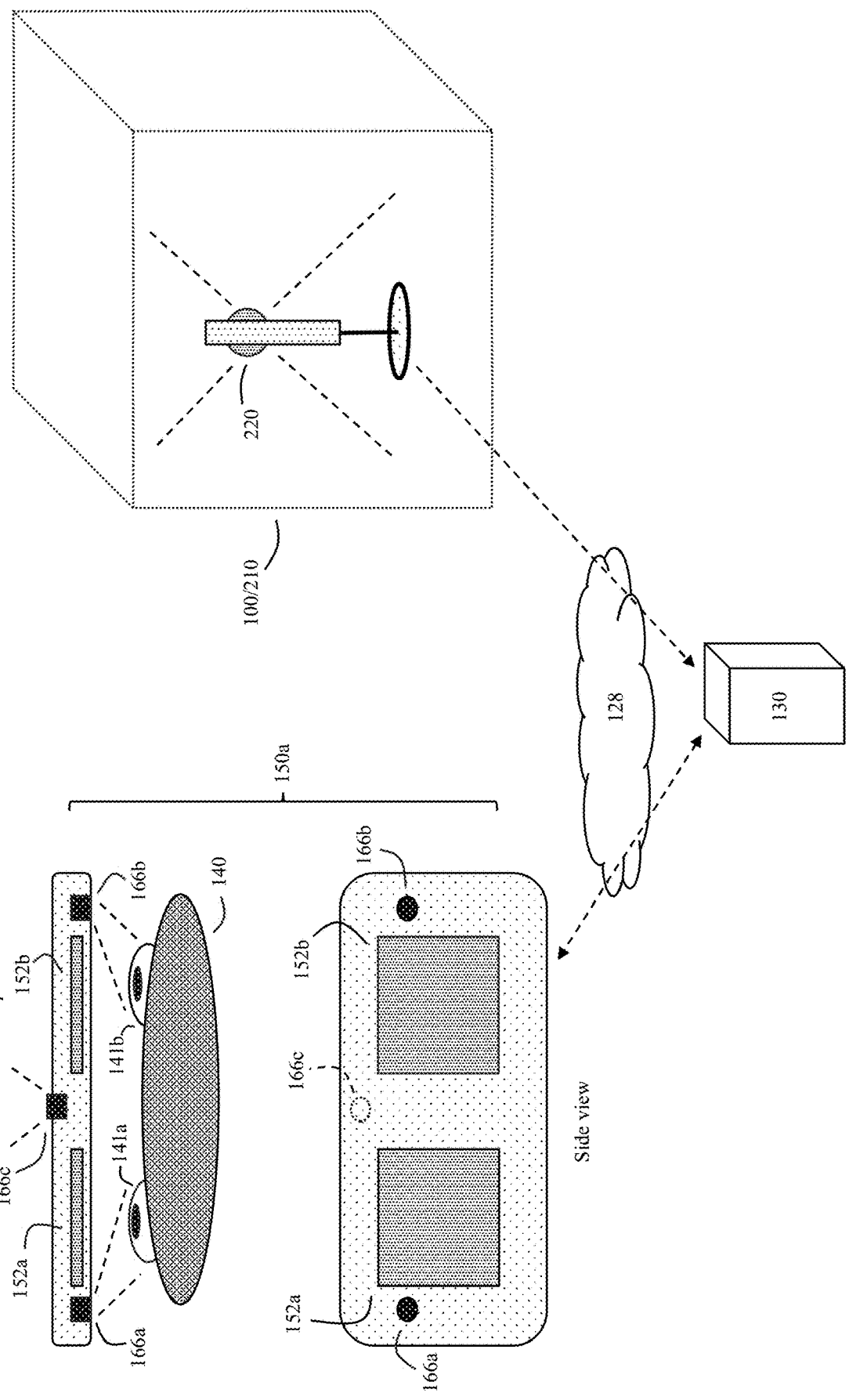

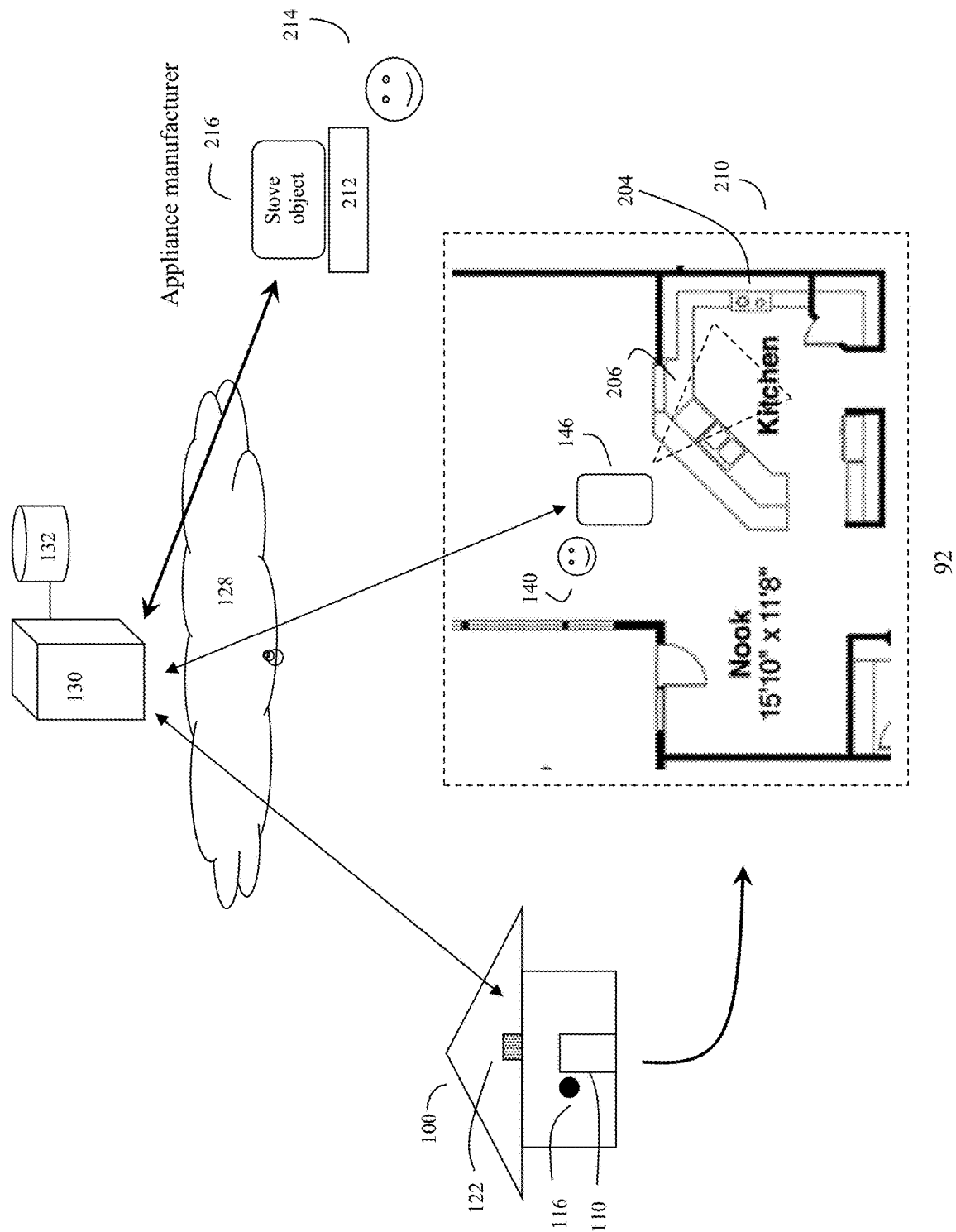

SYSTEM AND METHOD OF AUTOMATED REAL ESTATE ANALYSIS

CROSS-REFERENCE TO RELATED APPLICATIONS

This application is a continuation in part of U.S. patent application Ser. No. 18/466,311, filed Aug. 8, 2023; this application is a continuation in part of U.S. patent application Ser. No. 18/068,480, filed Dec. 19, 2022, now U.S. Pat. No. 11,720,986 issued Aug. 8, 2023; application Ser. No. 18/068,480 was a continuation of U.S. patent application Ser. No. 17/525,874, filed Nov. 13, 2021, now U.S. Pat. No. 11,532,058, issued Dec. 20, 2022; application Ser. No. 17/525,874 was a continuation of U.S. patent application Ser. No. 17/239,568, filed Apr. 24, 2021, now U.S. Pat. No. 11,182,865, issued Nov. 23, 2021; application Ser. No. 17/239,568 claimed the priority benefit of U.S. provisional patent application 63/014,955, filed Apr. 24, 2020; the entire contents of these applications are incorporated herein by reference.

BACKGROUND OF THE INVENTION

Field of the Invention

This invention is in the field of computerized systems and methods useful for analyzing real estate.

Description of the Related Art

Purchasers, renters, and lessees of real estate, be it residential or commercial, make hundreds to thousands of different judgments as they evaluate a given property and, as does landlords, investors, developers, sellers and real estate brokers. Although some of these judgments are relatively objective—such as square footage, proximity to work, and schools, other decisions are subjective. These subjective judgments can include colors, types of appliances, interior and exterior layouts, and the like. Preferences in floor layouts have tended to oscillate back and forth between open floor plans and alternative plans where different areas were more separated. Certain types of rooms such as kitchens and dining rooms can be perceived as more or less critical. Color preferences tend to change over eight-to-ten-year intervals. Certain appliance types fall in and out of favor, and so on.

In the real estate industry terminology, a person who visits a real estate property with at least some interest in evaluating the property for a potential purchase, renal, or lease is often termed a "prospect." Here the terms "visitor" and "prospect" will occasionally be used interchangeably.

Note also that the real estate industry terminology often distinguishes between residential and commercial real estate. However, since both terms simply apply to alternate uses of a given real estate property, in this disclosure, unless otherwise specified, the term "real estate" generally refers to any type of real estate.

The universe of decisions to be made with commercial properties is equally complex and vast. Whether you are a developer, owner, investor, seller, buyer, lessee, real estate broker, or other interested party, the myriads of data that must be taken into account and analyzed. Not only is this time-consuming, but often based on insufficient data, insufficient statistical analysis, and hunches. All the above interested parties often learn by expensive trial and error. Even then, decisions are often flawed causing significant losses of money.

By way of a residential real estate example, these judgments also vary substantially according to the demographics of a given real estate market. A higher-cost property may tend to appeal to older visitors/prospects, who may have formed their preferences in an earlier era. In comparison, a lower-cost property may appeal to younger candidates, who may have very different tastes.

A good commercial real estate example would be the many factors a lessee takes into account when selecting a site. For example, ingress and egress to the site, local amenities such as food, daycare, gyms, the quality of the facility, the price of the rent and ancillary expenses—to name just a few.

Corporate tenants often need to analyze whether it is better to lease or purchase a facility. The converse can be said for an owner of a commercial property. Depending on a myriad of factors, is it better to lease a facility or sell it.

Conversely, a developer of a commercial property takes in many factors such as demographics, need for the type of commercial real estate, zoning, cost of construction, expected rents, current mortgage rates, density of prospective corporate tenants in the area, again, just to name a few factors involved in a complex decision.

For both corporate space users and owner/developers, market trends, technological trends, migration trends, to name a few, must be taken into account. A prime example of this is that post the Covid pandemic, many office buildings have unfunctionally low occupancy rates. It may be said that the pandemic was the match that lit the fire of Work From Home and Hybrid work models, but technologies such as high-speed and low-cost broadband, Wi-Fi, camera equipped laptops, tables, iPhones, Microsoft Teams, Zoom meetings, etc., was the underlying and enabling technology that allowed and still allows millions of office workers to work from home. Then there are population trends such as migration to different states by the office workforce that further changed the office space dynamic, perhaps forever. The invention, by gathering property touring data, and analyzing such data with and without AI, can offer all stakeholders the intelligence they need to make better decisions, drive down costs, improve profit and even employee happiness.

Real estate, in all its forms, is an integral part of the economy, and an improved understanding of user preferences is of high interest to many economic sectors. In addition to obviously being of great interest to real estate owners and managers, consumer preference information is also of great interest to various real estate products or service providers. These can include the construction industry, designers, architects, equipment manufacturers, real estate service providers, and the like.

Quantitative methods of establishing consumer preferences are well established in certain industries. An early example of this is the Nielson rating system, which monitored user television viewing preferences. The process of monitoring consumer preferences is competitively simple for internet media because data going to each viewer can be precisely tracked and analyzed.

By contrast, monitoring real estate consumer preferences is far more challenging. This is because accumulating data is quite difficult. The underlying raw data is often obtained during renting, leasing, or selling real estate property, but this is very labor-intensive. This traditionally has demanded much one-to-one in-person contact between persons interested in purchasing, leasing, or renting the property (often called "prospects") and the persons who are owners or agents of the owners, such as real estate brokers and the like.

Typically, for any given property, before any transaction occurs, the owners, brokers, or other agents, must conduct in-person tours with many, sometimes hundreds, of different prospects. This involves much travel, wasted time and energy (e.g., automobile gas), and pollution. In-person real estate tours are also an excellent opportunity to spread infectious diseases between individuals.

Due to a lack of good quantitative data on consumer preferences, the process of optimizing matches between potential prospects and various real estate property is also cumbersome. This is an area that is often done by intuition rather than by actual hard data as to actual user preferences. As a result, specific improvements can be hit-or-miss, with much wasted time and money if present user choices don't match expectations.

In addition to renting, leasing, and selling real estate property, equipping or remodeling a property is inefficient and time-consuming. The process of selecting various furniture, fixtures, appliances, remodeling, or landscaping tasks often requires much time for analysis and often multiple visits by the persons ultimately selected to perform these activities.

Generative AI

Generative AI is an overall term for systems and methods (neural nets, algorithms) that can generate new content from various types of input data (e.g., prompts). Generative AI systems and methods are described in the work of Brynjolfsson et al., National Bureau of Economic Research working paper 31161, 2023; Feuerriegel et. al., Bus. Inf. Syst. Eng 66 (1): 111-126 (2024); Epstein et. al., arxiv: 2306.04141v1 (2023) and other publications.

Generative AI systems a more general type of AI system, often formed from large numbers of trained artificial neural networks, that can produce visual (images, video) and audio (sound, music) output, as well as text output. Large Language Models (LLM) are a good example of one type of Generative AI that is a bit simpler to discuss, so LLM will be discussed in more detail below.

Large Language Models (LLM)

Large language models (LLMs) are a subtype of generative AI, artificial intelligence (AI) or machine learning computer systems that typically comprise multiple Central Processing Units (CPU), multiple Graphics Processing Units (GPU), memory, and other devices, and are trained on massive datasets of text and code. This allows them to perform a variety of tasks, such as generating text, translating languages, writing different kinds of creative content, and answering questions in an informative way. LLM.

LLM are described in Liu, "Summary of ChatGPT/GPT-4 Research and Perspective Towards the Future of Large Language Models", 2023, arXiv: 2304.01852; and Xie "Towards AGI in Computer Vision: Lessons Learned from GPT and Large Language Models", 2023, arXiv: 2306.08641; the entire contents of these disclosures are incorporated herein by reference.

LLMs are built with artificial neural networks, which are able to learn patterns in data. The larger the dataset that an LLM is trained on, the more patterns it can learn and the better it can perform its tasks. Some current specific examples of LLM include:

GPT-4 & 4.0 (Generative Pretrained Transformer 3) is a large language model developed by OpenAI. It is one of the most powerful LLMs available, and it can be used for a variety of tasks, such as generating text, translating languages, and writing different kinds of creative content. Other examples include:

Claude.ai

Gemini

GPT-Neo, GPT-J, and GPT-NeoX: Open source models that can perform few-shot learning and generate natural language.

XLNet: A model that can perform various NLP tasks such as reading comprehension, text classification, and sentiment analysis.

Roberta, DeBERTa, and XLM-ROBERTa: Models that improve the performance of BERT by using more data and better training strategies.

DistilBERT: A smaller and faster version of BERT that retains most of its accuracy.

BERT, GPT-3, and Transformer: The most popular models developed by Google, OpenAI, and Microsoft respectively. BERT (Bidirectional Encoder Representations from Transformers) is a large language model designed for natural language understanding tasks, such as question answering and sentiment analysis. T5 (Text-to-Text Transfer Transformer) is a large language model also developed by Google AI. It is designed for text-to-text transfer tasks, such as translating languages and summarizing text.

LaMDA, Chinchilla, LLAMA: New models that can handle open-ended conversations and complex reasoning.

And most certainly, many more types of LLM and AI will continue to be introduced in the future.

Companies that lease GPU and servers for remote LLM services include Microsoft Azure OpenAI service, Amazon SageMaker, CoreWeave, Vectara GenAI, and others.

AI Based Image Methods

AI-based image methods, such as Midiourney, Stable Diffusion, DALL-E, and the like are computerized systems that use text prompts to produce or manipulate images. These are often used as part of, in combination with, various LLM methods. See, for example, Ploennigs and Berger, "AI Art in Architecture", (2022), arXiv: 2212.0939, the entire contents of which are incorporated herein by reference.

BRIEF SUMMARY OF THE INVENTION

The invention is inspired, in part, by the insight that modern computerized technology and broadband internet can be used to provide more efficient automated alternatives to the traditional, time and labor-intensive real estate analysis process.

The invention is also inspired, in part, by the insight that scheduled tours of real-world real estate property are an underutilized opportunity to obtain large amounts of data on consumer preferences with regards to many aspects of real estate.

In part, the invention is also inspired by the insight that some real estate visitors may object to be monitored by on-site sensors during a tour due to privacy concerns. However, as is the case for many "free" internet services, the same users might cheerfully consent to provide valuable data, such as their position and orientation data, if they are provided with various useful services in exchange for providing such data. As will be discussed, the present invention provides several such valuable services to encourage willing user participation.

The invention may be viewed as having various embodiments. These primary embodiments may be combined in any combination and may also be used on a stand-alone basis as desired.

In some embodiments, the invention can be a computerized method of allowing prospective tenants or buyers to tour a property with no one else present and obtain useful data on their preferences during such tours. In other words, an automated method of both safely providing "self-guided tours and tracking users during such tours." These prospective tenants or buyers are often users who are real-estate "prospects" that may otherwise be unknown to the property owner or agent. The invention allows these users to tour a property while no one else is present under carefully automated monitoring situations. This basic embodiment relies on user-assigned validated personal mobile computerized devices, such as smartphones, to allow users to sign up with a remote server, such as at least one remote internet server, adequately identify themselves, and schedule an "on-demand tour." The properties in question are connected with the remote server (e.g., an internet server). They may employ electronic lock-equipped doors and suitable property located cameras and sensors to monitor the user during the tour.

In some embodiments, this system can also accumulate statistics on user activities during the tour and/or present the user with various useful documents depending on the user locations during the tour. Various additional features, including different automated document management functions, will also be discussed.

In some embodiments, the invention can also be viewed as an improved computerized method of keeping track of user activities while touring a real estate property (see FIGS. 19A, B, and C). The invention uses various location-based sensors and optional connections to user-carried wireless computerized devices such as smartphones. The invention tracks user proximity to various locations of interest. In some embodiments, the invention can additionally, or alternatively also track user orientation (e.g., if the user is facing towards, facing away, looking at, looking away) from these locations of interest.

The invention can also keep track of additional information, such as the overall duration of the user's property tour. Further information, such as user duration in a particular part of the property, can also be obtained. For example, in a residential property, the invention can keep track of the time a user spends in a particular room, such as the kitchen. In a commercial property, the system may alternatively keep track of the time that a user spends in a specific part of an office or warehouse. This tour "intelligence" can be captured over either individual tours or over multiple tours. This way, aggregated information from either numerous prospects or by the same prospect re-touring a given property multiple times, can be obtained.

Additionally, as will be discussed in more detail shortly, by using cameras (which may operate in any of visible light or infrared light wavelengths) and AI analysis methods, what these prospects are looking at and for how long can be tracked. This data may be processed one or more types of AI system to determine what most interests prospects (visitors) about the property.

The system will often transmit this data to a remote server, such as at least one internet server, where it can be retransmitted, stored, and analyzed as desired. This method is advantageous when used to aggregate statistical data over multiple users, multiple properties, and multiple locations of interest. This way, deviations from statistical averages can be flagged as being of potential interest. For example, assume that one location of interest is a kitchen. Suppose the system detects that the users at a given property spend appreciably more or less time than average staying in the kitchen or looking at the kitchen appliances. Additionally, with the tracking of eye movements and duration, the prospect's focus (interest level) can be ascertained. The invention then uses AI to make further predictions as to what would interest this prospect as well as statistically what would interest all prospects. It then can interact with a particular prospect or group of prospects offering suggestions and recommendations. In that case, this can help provide some objective evidence that this kitchen is regarded either favorably or unfavorably.

Furthermore, the prospect may interact with the AI using voice, gestures or text. Thus, AI Chatbots can interact with the prospect or prospects answering common questions in just the same way a human might. These interactions may take the form of responsive texts, voice responses and video responses. AI bots may even appear human or human like. The AI interaction is so smooth the prospect may not even realize they are dialoging with AI. This greatly frees up the interested stakeholder, such as, but not limited to sellers, landlords and real estate brokers.

The invention was also inspired, in part, by the insight that LLM based systems and methods can be extremely useful for real estate analytical purposes. Although such LLM will typically be trained using an extensive amount of real estate information obtained from outside sources, which often will be publicly available information, in some optional embodiments, such LLM methods can be further informed by such statistical data (e.g., aggregated statistical data over multiple users), such as that provided by the system. Such statistical data provide some unique insights that otherwise might not be available, which an LLM system can further leverage to provide useful analysis and insights.

Beyond LLMs, the invention can use Generative AI to interact with prospects utilizing various formats such as audio, video, pictures, that go beyond text.

In some embodiments, the invention can provide an improved computerized augmented reality system oriented towards real estate property applications. In these embodiments, a remote server, such as a remote internet server, often operated by a source ("source") of products or services, can be configured with a plurality of different virtual objects, each with virtual object appearance information and other virtual object associated information. These objects can be virtual objects about real-world appliances, furniture, remodeling, construction, and landscaping objects.

In some embodiments, these AI or LLM systems may be used to help recommend, choose or select which virtual objects should be used. The AI or LLM systems may also be used to generate proposals or images, and to provide at least some AI or LLM recommended changes either one or more toured real-world real estate property, even any real estate property. Thus, in some embodiments, the AI or LLM recommendations may also be applied to non-monitored real world real estate property, and/or even planned or virtual real estate property.

In these embodiments, a server may be configured with a suitable standardized API (application programming interface) so that a plurality of different sources may upload virtual objects that correspond to that source's real-world products or services to the server. A user may use their smartphone or other computerized device cameras to image portions of the property and request download of various virtual objects and virtual object information from the remote server. This user may be a prospect or other user who is simply touring a property or may alternatively be any other type of person, such a renter, lessor, property owner, or agent.

The advantage of this embodiment is that it can help users better visualize changes to the property. Other embodiments of this system can also provide various automated document handling systems as well. These automated document handling systems can facilitate the acquisition of those real-world objects that correspond to the augmented reality objects chosen by the user.

Note that although home real estate examples will often be used in this application, these examples are not intended to be limiting. The methods and systems taught herein are intended to apply to both home and commercial real estate.

BRIEF DESCRIPTION OF THE DRAWINGS

FIG. 3C shows a detail of an alternate type of mobile computerized device, such as an augmented reality or virtual reality headset device.

This allows the system to produce statistics on how users react to designated portions of a given property.

FIG. 18A shows how in some embodiments, the server may also store various virtual objects from multiple sources, such as different suppliers of products and services. Users can use their smartphones to call up these products and services and display them, in the context of the property, using augmented reality methods.

Figure 18B:
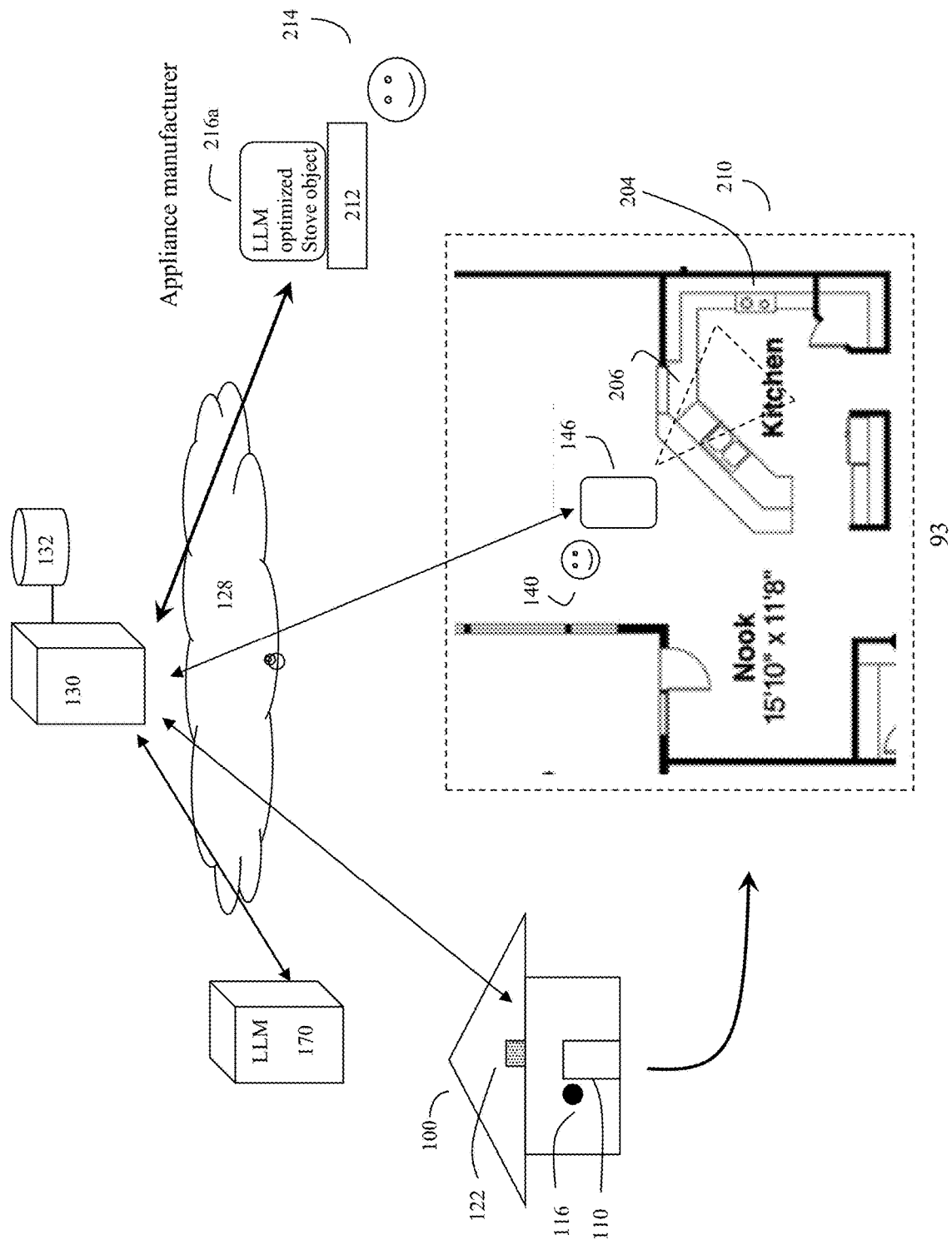

FIG. 18B shows how in some embodiments, the server may either further comprise an LLM server, or else be connected to a remote LLM server, to add additional intelligence to the process. The LLM will preferably comprise a specialized real estate dataset, and in a preferred embodiment may further draw upon the system's own database of statistics on how users (often in a given area, such as a given Zip code) react to designated portions of a given property.

Figure 19A:
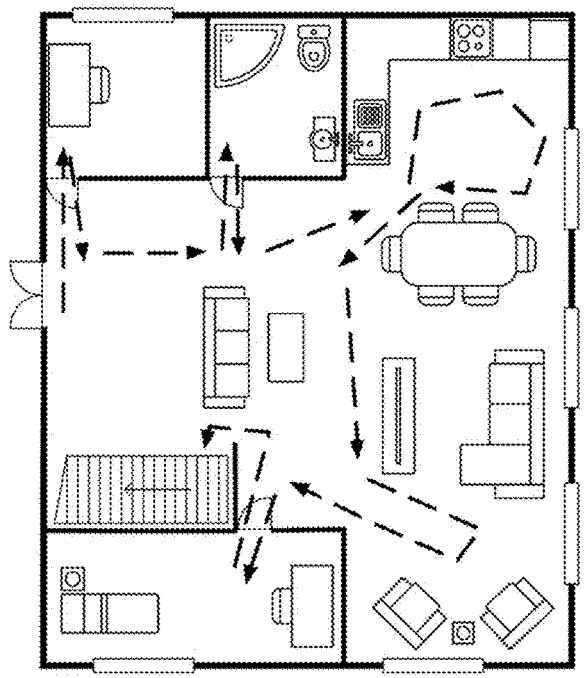
Figure 19B:
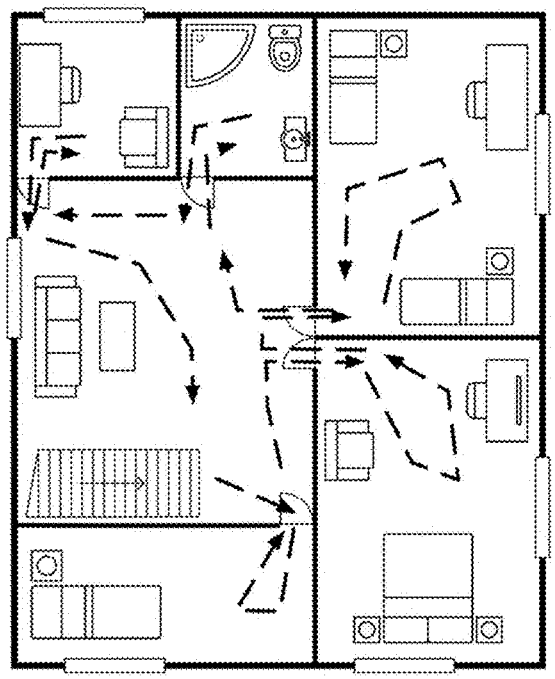
Figure 19C:
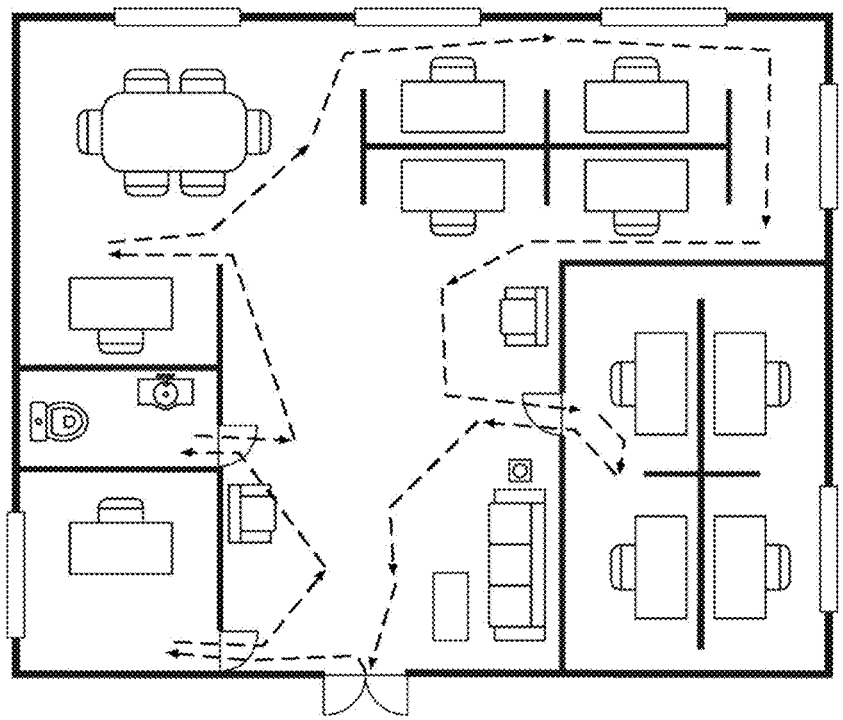

FIGS. 19A, B, and C show the route that a user (here one user touring by himself as a single prospect user) has taken through various properties. FIG. 19A illustrates the route that this user took on the first floor of a residential property, FIG. 19B shows the route that this user took on the second floor of a residential property. FIG. 19C depicts the route that this user took on a commercial property floor (here an office building).

Figure 20A:
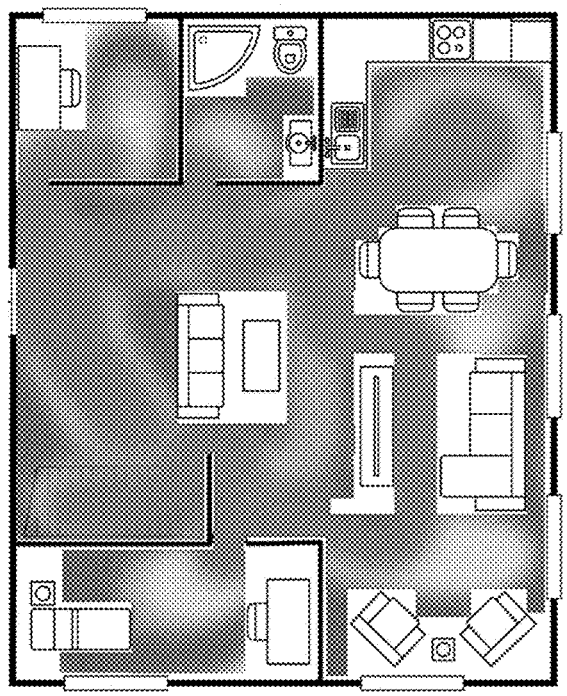

FIG. 20A shows a heat map showing areas most traveled by multiple visitors (such as 20+ prospect users) to the first floor of the residential real estate property.

Figure 20B:
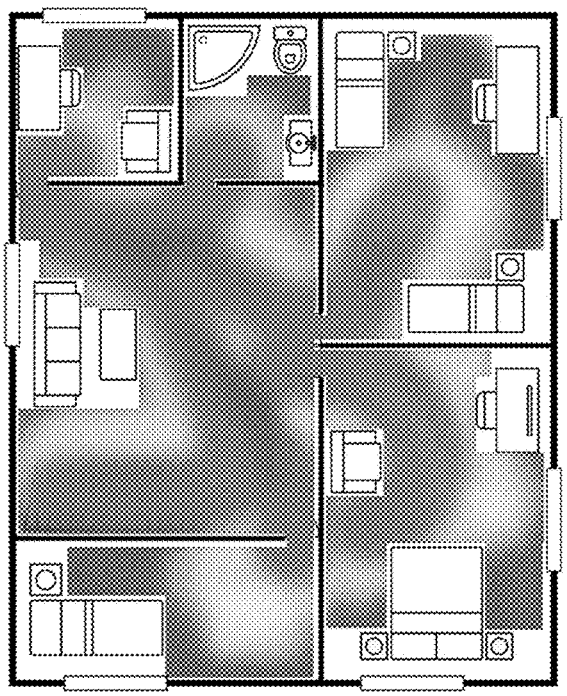

FIG. 20B shows a heat map showing areas most traveled by multiple visitors to the second floor of the residential real estate property.

Figure 20C:
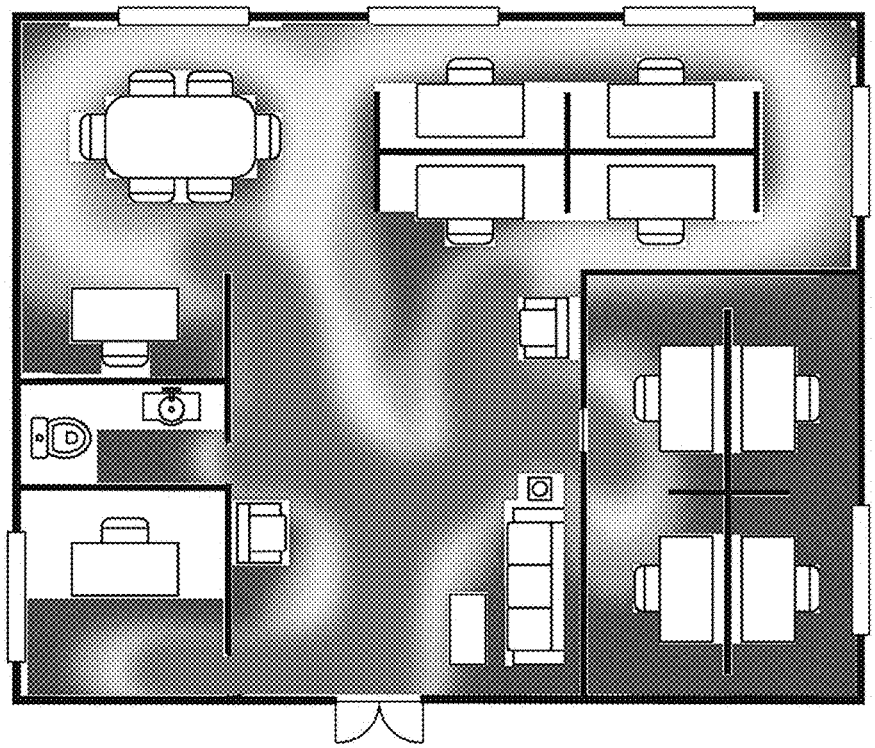

FIG. 20C shows a heat map showing areas most traveled by multiple visitors to the commercial real estate property floor (again, an office building).

Figure 21A:

FIG. 21A shows how a visitor/user can upload a photo of a real-world visited house into the system, and then ask the system to visualize how the house might look if remodeled according to statistical data corresponding to the real-world preferences of other visitors and other houses in a given area.

Figure 21B:

FIG. 21B shows how the LLM system can use statistics accumulated from multiple visitors, and various user prompts, such as input photographs of a house, and a prompt to show what the house would look like if upgraded according to statistics of local visitor preferences, to reprocess this house photo according to these local visitor preferences.

DETAILED DESCRIPTION OF THE INVENTION

This disclosure will occasionally use real estate terminology. Here a brief definition of some standard real estate terms is provided.

Prospects (visitors) for residential real property can be an Apartment Tenant or Home Buyer. For commercial real estate, the prospect can be any commercial space user (buyer or lessee), such as, but not limited to: office, warehouse, and retail.

Owner—fee simple owner. The owner can also be a seller or lessor. The owner can have owner representatives (often employees of the owner) that generally do not need to be licensed by the state because they are working directly for the owner.

Brokers are typically licensed by the state, and often act as agents for either the owner or the prospect, on a non-employee basis. Brokers may have their own authorized agents, also known as licensed salespersons, who in effect also act as subagents for the owner or prospect.

This disclosure also introduces the concept of a "tour operator"—as this sounds, a tour operator may, remotely from a distance, conduct prospects through real-world property tours of one or more property sites. A tour operator can be an owner or a broker or another direct or indirect agent or employee of the owner.

In this disclosure, since potentially all of the above may use the invention, we will generally use the term "user" to cover all of the above, with further subdivisions of "users" as discussed in the text. The default user should be considered to be at least the "prospect."

In this disclosure, smartphones are often used as one specific example of a mobile computerized device. Tablets and headsets are other examples of a mobile computerized device. Smartphones are typically user-assigned (e.g., typically a user is the "owner" of a specific and registered smartphone). Smartphones, tablets, and headsets can also be validated (that is, unique identification codes or biometric sensors (168) on the smartphone can be used to ensure that communications are coming from the "true" smartphone and user, and not a "spoof" or counterfeit smartphone.) Examples of smartphones are the Apple IOS series, such as the Apple 4, 5, 6, 7, 8, 9, 10, 11, 12 series, as well as later models. Other examples include the popular Android series, made by Samsung and other manufacturers. Although smartphones are a specific example of such mobile computerized devices, other mobile computerized devices with different form factors, such as the watch (e.g., Apple iWatch), tablet, laptop form factor, and headsets may also be used. Thus, the term "smartphone" although often used for brevity, should be construed to include these other types of mobile computerized devices as well. Headset devices, such as augmented reality headsets and virtual reality headsets, will be discussed in more detail shortly.

In some embodiments, the user's smartphone(s) may be equipped with a "tour app." This tour app will typically be a downloadable app configured to run under a suitable smartphone operating system such as iOS or Android. However, in some embodiments, the "tour app" may be configured as part of the smartphone's operating system, and such operating system embedded versions of the "tour app" are not disclaimed.

Users may use this tour app to facilitate some of the various methods described in this disclosure. For example, users may initially pre-register with the invention's internet server. The users may also verify their identity using the smartphone's biometric sensors (e.g., fingerprint sensors, face sensors 168) at any time (either during or after registration).

After user registration and identify verification, the tour app may use the smartphone's GPS (global positioning system) receiver, to inform the server that a user with a confirmed biometric signature has arrived at a properties GPS location at a given time. If this time is an authorized tour time, and if the user is approved, the system's internet server admits the user (e.g., unlocking one or more electronic locks). The tour app may also be used by the system for user tracking during the tour itself.

In addition to cellular transceivers, modern smartphones are also equipped with other types of short-range radio transceivers, such as WIFI and Bluetooth transceivers. In some embodiments, the location of any property-located short range (e.g., less than 300-foot distance) wireless transmitter or transceiver, such as WIFI or Bluetooth transceivers, may be reported to the invention's internet server in advance. In such embodiments, the tour app can be further configured to monitor signals from these property-located WIFI or Bluetooth transceivers, and report these signals to the internet server during the tour. This data can supplement any GPS user position data. These methods, supplemented by additional property located sensors, can allow the invention's internet server to better estimate the location of the user during the tour.

Figure 1:
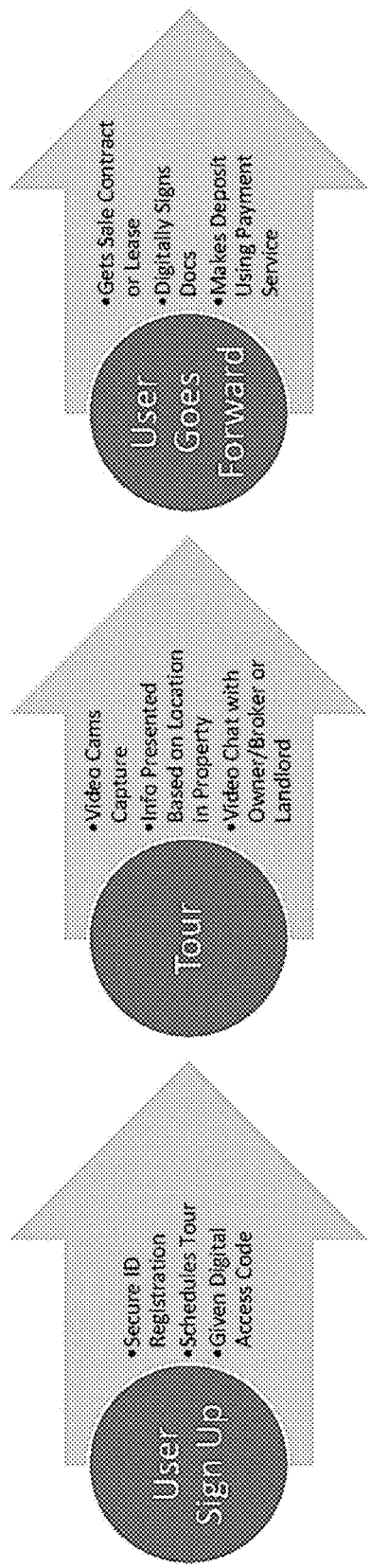
FIG. 1 shows an overview of one embodiment of the invention. Here users, such as real estate prospects, who are interested in evaluating a real estate property by themselves (e.g., without anyone else present) can use their smartphones or other computerized devices to contact (usually over the internet) a suitably configured internet server. The users can use various registration methods to establish their identities and schedule a tour. Those users cleared by the system can automatically receive an "unlocking code" or equivalent signal from the server. This signal can be used to unlock electronic lock-equipped doors that may be protecting the property.

FIG. 1 shows an overview of one embodiment of the invention. Here users who are interested in evaluating presently unoccupied real estate property can use their smartphones or other computerized devices to contact (usually over the internet) a suitably configured internet server. The users can use various registration methods (optionally with the aid of a "tour app") to establish their identities and schedule a tour. Those users that are accepted can automatically receive an "unlocking code" or other type of signal from the server that unlocks any electronic locks protecting the property. The use of such electronic lock techniques was previously taught by the applicant in commonly owned and invented U.S. patent application Ser. No. 13/844,291, the entire contents of which are incorporated herein by reference. Computerized methods have multiple uses, including automatically enabling authorized "prospect" type users to tour property by themselves (unaccompanied by any other person). These methods can comprise conducting at least one scheduled tour of at least one internet-connected real-world real estate property using a user-assigned validated personal mobile computerized device (such as a Smartphone) that is wirelessly connected to at least one internet server. Other types of mobile computerized devices, such as tablet computers and laptop computers may also be used. Here the term "smartphone" will occasionally be used in the alternative to mean a personal mobile computerized device.

The user-assigned validated personal mobile computerized devices will typically comprise at least one processor, memory, graphical user interface, at least one wireless transceiver (often a cellular transceiver, and even other wireless transceivers such as WIFI and Bluetooth transceivers). The device will typically also comprise a device camera (e.g., at least one video camera) and at least one location-determining device (such as a GPS receiver). The server will typically comprise at least one server processor, server memory, operating system, server software such as operating system software and database software, and at least a network interface to the internet.

The internet-connected real-world real estate property will typically comprise at least one electronic lock (e.g., one or more electronically locked door) and at least one property-associated internet-connected sensor.

Smart Access Management for Automatic On-Demand Tours

According to the method, the user will typically use the at least one internet server to schedule a tour time window (here the term "time" generally means both the time of day and the date) for the user to physically (in person) tour the real-world real estate property. If the server has a schedule of available times, then this scheduling process may be fully automatic. Alternatively, the server may contact a human or other computerized device (such as an automated scheduling system on another computer) for authorization. To authorize the user, the server will typically also receive, user presence information from the user-assigned validated personal mobile computerized device and/or the at least one property internet-connected sensor that the user is present at the designated real-world real estate property during the scheduled tour time-window. According to the method, the at least one internet server and/or the user-assigned validated personal mobile computerized device (e.g., the user's smartphone) can be used to unlock the electronic lock (door) during this tour time window, thus allowing the user to enter the real-world real estate property. In an alternative embodiment, the prospect user may request more immediate access than a pre-scheduled appointment. The owner or broker or tour operator may grant such access in real-time and send the prospect user a one-time unlock code.

FIG. 1 also shows that various sensors on the property, such as video cameras and/or other sensor types, can communicate with the server, allowing the server to collect information on user's activities (e.g., locations as a function of time). In an alternative embodiment, the user may use the video cameras with their own mobile device such as a smartphone or table to establish a video chat. Either the prospect user or the owner, broker or tour operator may use such mobile device to conduct these video chats. As example would be the prospect user contacting or being contacted by the other users (owner, broker, tour operator) while touring the property. In such a case, it is as if the owner, broker, tour operator is right there to answer the prospect user's questions and provide information. They may also ask information of the prospect user.

Put alternatively, in some embodiments, the method can further use the user-assigned validated personal mobile computerized device and/or the at least one property sensor to inform the at least one internet server of least some user activities while the user is present on the real-world real estate property. The server can then retransmit these activities and/or store these activities in server memory as desired for further analysis.

In some embodiments, the method can further use the processor and at least one location-determining device (such as device GPS sensors, and/or location information from property based sensors or property based devices to display at least some information about the real-world real estate property on the smartphone's (or other personal computerized devices) graphical user interface (or other display) according to the location of the personal mobile computerized device during the one or more scheduled tours. Here, for example, if the server determines that the user has wandered into a kitchen, the server may transmit kitchen information to the user's smartphone, or other mobile computerized device. In another embodiment, the server may present different options for fixtures and/or configurations related to the location specific area, in this instance, the kitchen. So, the user may be presented with different choices for appliances. Another good example is the user may walk out to the back yard of a model home and be presented with choices for further property improvements such as decks, pools, hot tubs, landscaping. All these choices may be presented in an augmented reality presentation in which the improvements are superimposed on the existing real-life environment. Vendors and/or contractors for such furniture, fixtures, equipment, capital improvements to the property can be linked to the prospect. Thereby saving the prospect time and providing these vendors and/or contractors an opportunity to present their services and goods. In this embodiment, such vendors and/or contractors may also be considered users of the invention, and may optionally be charged a fee for the introduction to the prospect user.

FIG. 1 also shows that in some embodiments, the system can optionally also facilitate any user calls with the property owners, brokers, or landlords during the tour. The system server can also include various document auto-population methods and secure transmission methods to facilitate the exchange of various documents, such as bids, contracts, service orders, and the like. These will be discussed in more detail later in this disclosure.

Figure 2:
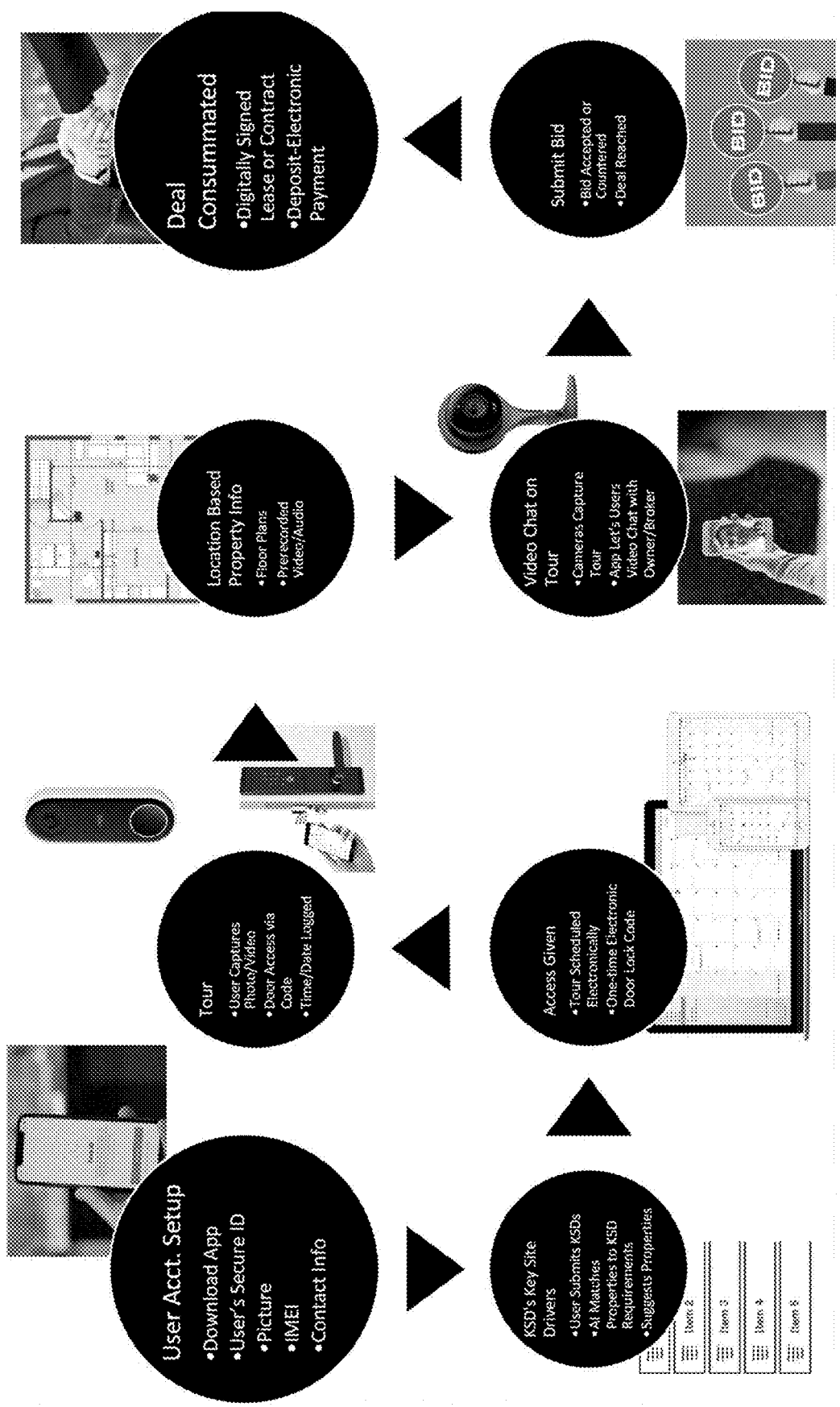
FIG. 2 shows a pictorial overview of one embodiment of the invention. Here, users can first verify their identity upon initial account setup, use various methods to search for desirable properties. The system allows these uses to automatically schedule visits to specific properties, even if those properties are unoccupied at the scheduled visit time.

FIG. 2 shows a pictorial overview of one embodiment of the invention, here showing how the users may first verify their identity upon initial account setup, optionally use various methods to search for desirable properties, and either manually or automatically schedule visits to certain properties, even if the properties are unoccupied at the time of the scheduled visit. The property will often have at least one electronic lock, and at least one sensor, to monitor the user and to permit those authorized users to open the electronic lock with a suitable server-supplied electronic code. The property will often have multiple sensors, such as one sensor per room, to monitor the visitor user's activities during the tour. In addition to security functions, this visitor activity data is very useful for many other purposes, such as allowing others to determine what portions of the property show evidence of unusually good or bad user interest. As previously discussed, the system can further include various types of document auto-populate functionality to facilitate user lease/purchase of the property, as well as work with other third parties as needed. These will also be discussed in further detail later in this disclosure.

Figure 3A:
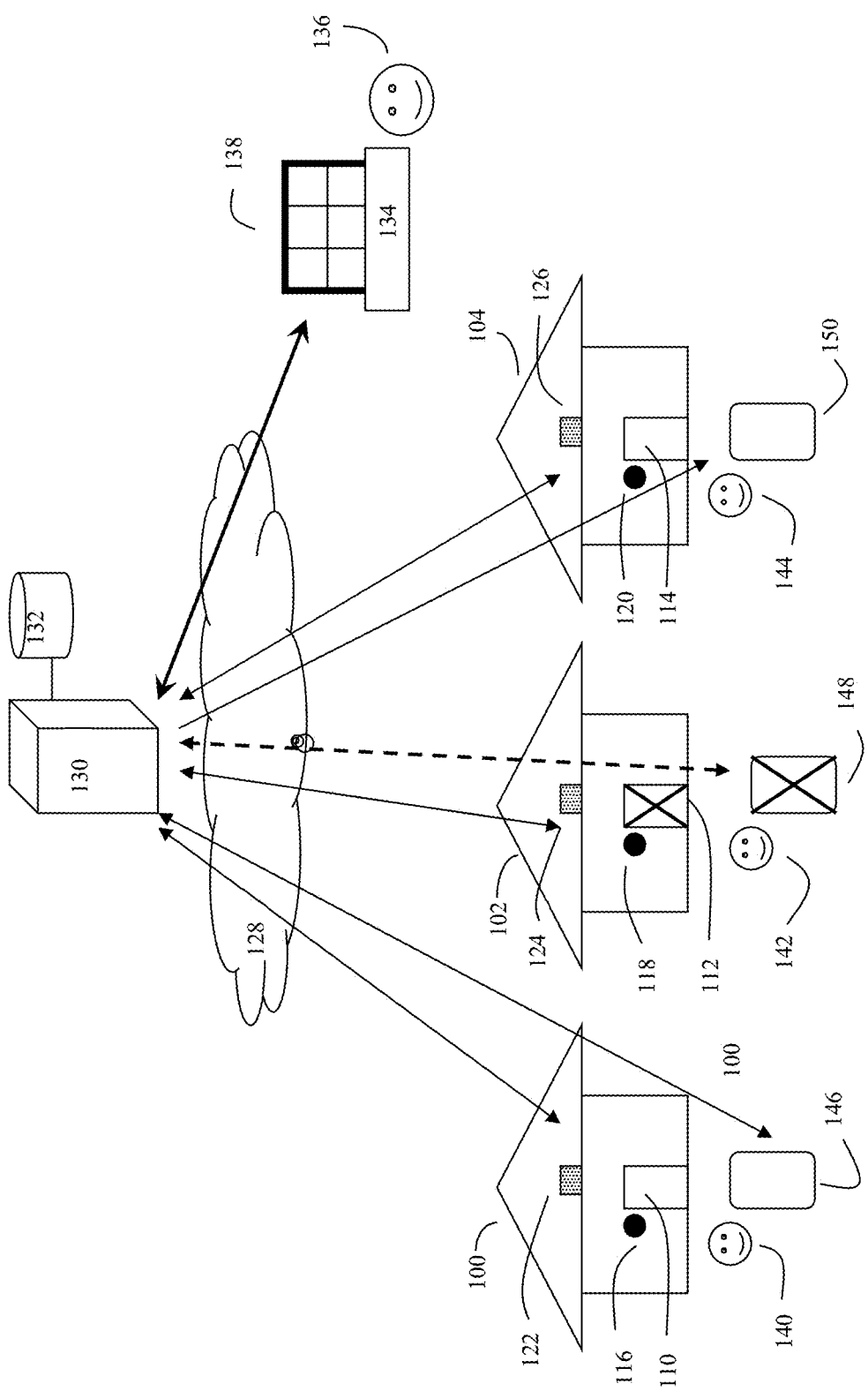
FIG. 3A shows an overview of how some of the significant hardware portions of the invention may interact.

FIG. 3A shows an overview of how some of the major hardware portions of the invention may interact. This figure shows three properties (here represented by houses 100, 102, 104). Each house is equipped with an electronically locked entrance door (110, 112, 114), and each house has two sensors, such as front door camera sensors (116, 118, 120) and at least one room monitoring sensor (122, 124, 126). These sensors and the electronic lock all communicate over the internet (128) with an internet server (130) with an associated server memory or database 132). Here, for example, the sensors and lock may be equipped with shorter range wireless transceivers, such as WIFI transceivers, and may communicate to the internet by one or more property WIFI routers that are in turn connected to the internet. Note that in this disclosure, all electronic locks are considered to be connected to doors, and thus the term "door" will frequently be omitted, and the term "electronic lock" will be assumed to refer to an electronically locked door. Note that a property may have more than one electronic lock and more than one electronically locked door, so that in some cases, users may be given entrance to some portions of the property, but not other portions of the property.

In this example, assume that all three properties are also managed by the same person, who can be the owner or an agent of the owner such as a broker, property manager, tour manager, and the like. In addition to automatically monitoring the status of the electronic locks and sensors, the server can optionally also transmit information from these various locks and sensors to a computerized device (134) assigned to this "agent" person (136). In some embodiments, the status of multiple properties can be displayed simultaneously on an agent dashboard (on a display screen/graphical user interface 138) running on the agent computerized device (134).

In this example, assume that three different "prospect" users (140, 142, and 144), each equipped with their smartphones (146, 148, and 150) have previously contacted the server (130). Users 140 and 144 have successfully validated themselves and have successfully scheduled tour times, and are appearing at the correct tour times. However, user 142 has either not correctly validated his or her identity, or has not received permission to tour, or is appearing at the wrong time.

The server (130) is configured to automatically recognize, based on the respective smartphone provided identity validation information and optional facial recognition of the user by other sensors such as the front door cameras (116, 118, 120), that the correct users are present at the correct scheduled time. Sever 130 thus transmits suitable electronic key information to unlock electronically locked doors (116, and 120). Users (140) can now proceed to tour property (110), and user (144) can now proceed to tour property (104). However, because user (142) validation and/or scheduling has failed, the server (130) does not transmit the electronic key information, and the door (112) remains locked. User (142) cannot tour property (102).

As will be discussed later in this disclosure, additional property associated sensors (122, 124, 126) can monitor user activities during the tour. These activities can be stored in the server database (132) and/or can be transmitted to other parties, such as agent computerized device (134), and may be optionally be displayed on a computer display screen or graphical user interface configured as a dashboard (138).

In some embodiments, such as when at least one sensor (such as 116, 118, 120) monitors at least a door equipped with an electronic lock (110, 112, 114), the user activities sent to the least one internet server (130) can comprise the time (and date) and identity of the user (prospect) (140, 144) when the user used the door (110, 114) to enter the property (100, 104). In alternative embodiments, the invention may also use motion sensors and/or the electronic lock to determine when the prospect user left the property, thus, it can be determined how long the prospect-users stayed at the property and that the property is now vacant once again.

Types of sensors: The various property-based sensors that may be used include door lock sensors (which may return time, date, identify of locking and unlocking signal), infrared sensors that may analyze how many people are in a room, their direction of entrance/exit, and their direction of motion. Cell phone/smartphone sensors may detect the presence of cell phones (smartphones) and capture unique cell phone identification information. Various RFID and Near Field (NFC) sensors may also be used to capture user proximity and user interactions with various portions of the property. Audio sensors, including microphones, and/or integration with smart, internet-connected audio devices (such as Amazon Alexa, Google devices) may capture sound information that can also be used to identify or locate visitors. Magnetic field detectors or radio field interference detectors can also be used to identify visitors. Pressure sensors may also be used. Additionally, the system may integrate with preexisting alarm sensors and obtain data from these sensors as well.

Various cameras, often internet-connected video cameras may also be used, often in conjunction with suitable automated vision software and/or AI image recognition software, to identify the location of visitors and/or their orientation and even their eye gaze direction as a function of time.

Various types of electronic locks and unlocking methods may be used, and the invention is generally agnostic as to the choice of the specific electronic lock and unlocking method.

Thus, in some embodiments, the electronic lock is configured to open in response to a wirelessly transmitted unlocking code (usually transmitted by server 130), and any of various options including:

Option A: the user-assigned validated personal mobile computerized device (smartphone) obtains the unlocking code from the internet server (130) and wirelessly transmits (e.g., Bluetooth, WIFI, RFID, Near field) the unlocking code to the electronic lock.

Option B: the internet server uses information obtained from the user-assigned validated personal mobile computerized device (smartphone) to directly transmit (e.g., over the internet) an unlocking code to the electronic lock.

Option C: the internet server transmits an optical (barcode or QR code) or manually enterable unlocking code to the user-assigned validated personal mobile computerized device, and the user shows the optical code to the electronic lock, or enters the unlocking code manually.

Validating the User

An important part of the invention is ensuring that the user identity is properly confirmed. Here various methods can be used. For example, the process of further user-assigning and validating the user's personal mobile computerized device (e.g., smartphone) to a specific user can be done by the following steps.

The user may use their mobile computerized device (smartphone) to contact the internet server (130). The server can automatically query the mobile computerized device that device's identification data. This identification data can be, or include, the device's IMEI code (International Mobile Equipment Identity number, which is unique mobile broadband device identification number). Other device identifying information, such as SIM card identification codes, or other device hardware identification number or numbers from the personal mobile computerized device may also be obtained and used. The mobile device can also be used to obtain certain personal user identification data (such as the user's driver's license, credit card information, and the like). The mobile device can also be used to upload one or more photos of the user, or other biometric information as desired.

In a preferred embodiment, the internet server (130) may then optionally also confirm the accuracy of the device identification data and the user identification data (often by requesting user verification, contacting third party servers, and the like). When the accuracy of this data is confirmed, the server will then complete the process of user-assigning and validating the personal mobile computerized device. In less preferred embodiments, however, one or more validation methods may be skipped, and thus the "user-assigned" and "validated" options are preferred but optional, at least if the property owner or agent wishes to assume the risk of skipping these steps.

Additional Safety Features

Users will often be using the invention to tour unfamiliar property unattended by any other individuals. Thus, in addition to property security issues, user security is also an issue. Thus, it will often be useful to equip the system with additional user security features. In some embodiments, the "tour app" may further be provided with a security "SOS feature," where the user (140, 144) can signal any of the internet server (130), and the owner, broker, or authorized agent (136) of various property (100, 102, 104) security issues. These security issues can range from physical problems (e.g., broken windows, unlocked doors, water damage, objectionable animals, etc.) to personal safety issues, such as the possible presence of an intruder on the property. A user (140, 144) worried about a potential intruder, but lacking enough direct knowledge to dial 911 or call the police, can nonetheless discretely signal the remote owner, broker, or authorized agent (136) to maintain a higher level of vigilance, and be ready to call for backup. The system can also be configured to allow the user to signal the level of concern, from "please watch me" to "call for help immediately." As needed, the system can also be configured to dial for assistance directly in high urgency situations.

In some embodiments, the system may also be configured to automatically monitor the microphone on the user's mobile device (146, 160) and use either human or artificial intelligence (AI) methods to make independent assessments as to if help should be summoned. Additionally, or alternatively, an AI system, such as a computer vision system, could also be set to an enhanced mode to monitor any property video cameras for problematic issues (such as the presence of an unexpected or unauthorized individual) in such situations.

Thus, if the user has 1) previously signaled a heightened security concern level, triggering microphone monitoring; and 2) the AI system then detects the audio signature of a scream, or an unexpected individual; then the system server (130) may automatically dial local emergency services (such as 911). The system may automatically report the property address, the user's previously transmitted level of concern, and playback the scream's recorded audio. Alternatively, the owner, broker, or authorized agent (136) may do these functions manually.

Figure 3B:
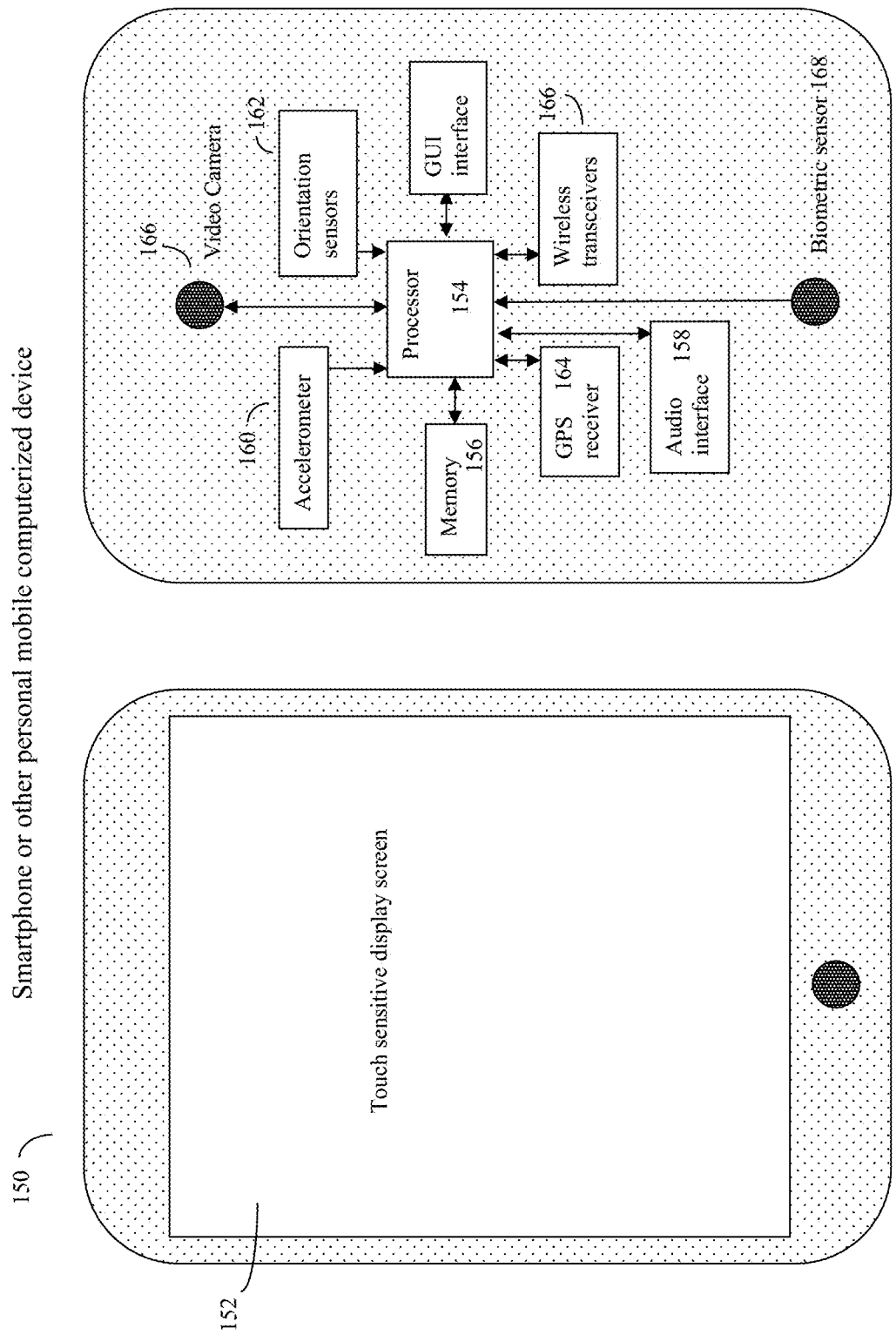
FIG. 3B shows a detail of a personal mobile computerized device such as a smartphone.

FIG. 3B shows a detail of a personal mobile computerized device, such as a smartphone.

In some embodiments of the invention, the smartphone (150) or other personal mobile computerized device may be a smartphone, watch, or tablet type computerized device, exemplified by the popular Apple iPad and iPhone devices, the Android cellular phone and tablet devices, and the Microsoft family of tablet computers and mobile devices. In general, such devices normally comprise a high-resolution display screen (152), often equipped with touch sensors, which often functions as the primary or secondary graphical user interface for the device. The devices additionally usually comprise at least one processor (154) (which may have one or more cores and graphics units), memory (156) (often approximately in the gigabyte range or higher), speakers or audio output jacks (158), microphones or audio input jacks. The devices often also comprise various accelerometers (160) or other types of motion and position sensors (162) such as Hall-effect magnetometer sensors capable of detecting device movement and orientation on the local scale. The devices also often comprise Global Positioning Receivers (164) capable of with, at least when supplemented by optional wireless signals from the Wide Area Augmentation System (WAAS), to pinpointing device position to an accuracy within a few feet or better. The devices may also comprise video cameras (166), and biometric sensors (168) such as fingerprint scanners or facial recognition scanners.

Such devices additionally often comprise one or more wireless transceivers (166). These wireless transceivers can include cellular phone transceivers (e.g., such as 4G, 5G transceivers), Wi-Fi transceivers, Bluetooth™ transceivers and the like. In some embodiments, these transceivers can, in turn, provide device connectivity to the Internet, and hence to various servers throughout the world, and also detect local short-range transceivers (e.g., WIFI, Bluetooth.)

FIG. 3C details an alternate type of mobile computerized device, such as an augmented reality or virtual reality headset device (150a). This type of device will generally have all or nearly all the same components as discussed above but will generally also have at least two displays (152a and 152b) and an optical lens arrangement so that for each user (140), the user's left eye (141a) can focus on the left display (152a), and the user's right eye (141b) can focus on the right display. Both displays may be driven by one or more processors, such as FIG. 3B (154), which in turn can use wireless transceivers (3B, 166) to communicate to external devices such as external servers (128) over the internet (128) or other types of computer network.

The headset device (150a) will often also have orientation sensors (3B, 162) and position sensors (3B, 164), and usually a plurality of video cameras (here designated 166a, 166b, and 166c). The headset device may also have microphones or other types of audio interface (3B, 158), and various control knobs or switches as needed. In contrast to the FIG. 3B, however, the display screens need not be touch sensitive. Instead, the system can provide a GUI type interface by using its inside directed video cameras (166a, 166b) to monitor the user's eyes (141a, 141b). Here for example, device 150a may use internally directed video cameras (166a and 166b) to monitor the user's eye gaze direction and duration. Device 150a may also use one or more externally directed video cameras (166c) to monitor the position of the user's hands and fingers, and obtain further "GUI type" input from these. The device may also monitor audio input from the microphone, as well as any input from control knobs and switches.

Note that since eye patterns are unique to each individual, the internally directed video cameras (166a, 166b) may also perform the function of a biometric sensor (3B, 168). Alternatively, other types of biometric sensors may also be used.

As will be discussed, the user (140) may either choose to wear the headset device (150a) while touring a real-world real estate property. Alternatively, as will be discussed shortly, in other embodiments, the user may wear the headset device to tour a virtual copy of at least one real-world real estate property. The process of making and using such virtual copies will be discussed shortly.

Figure 4:
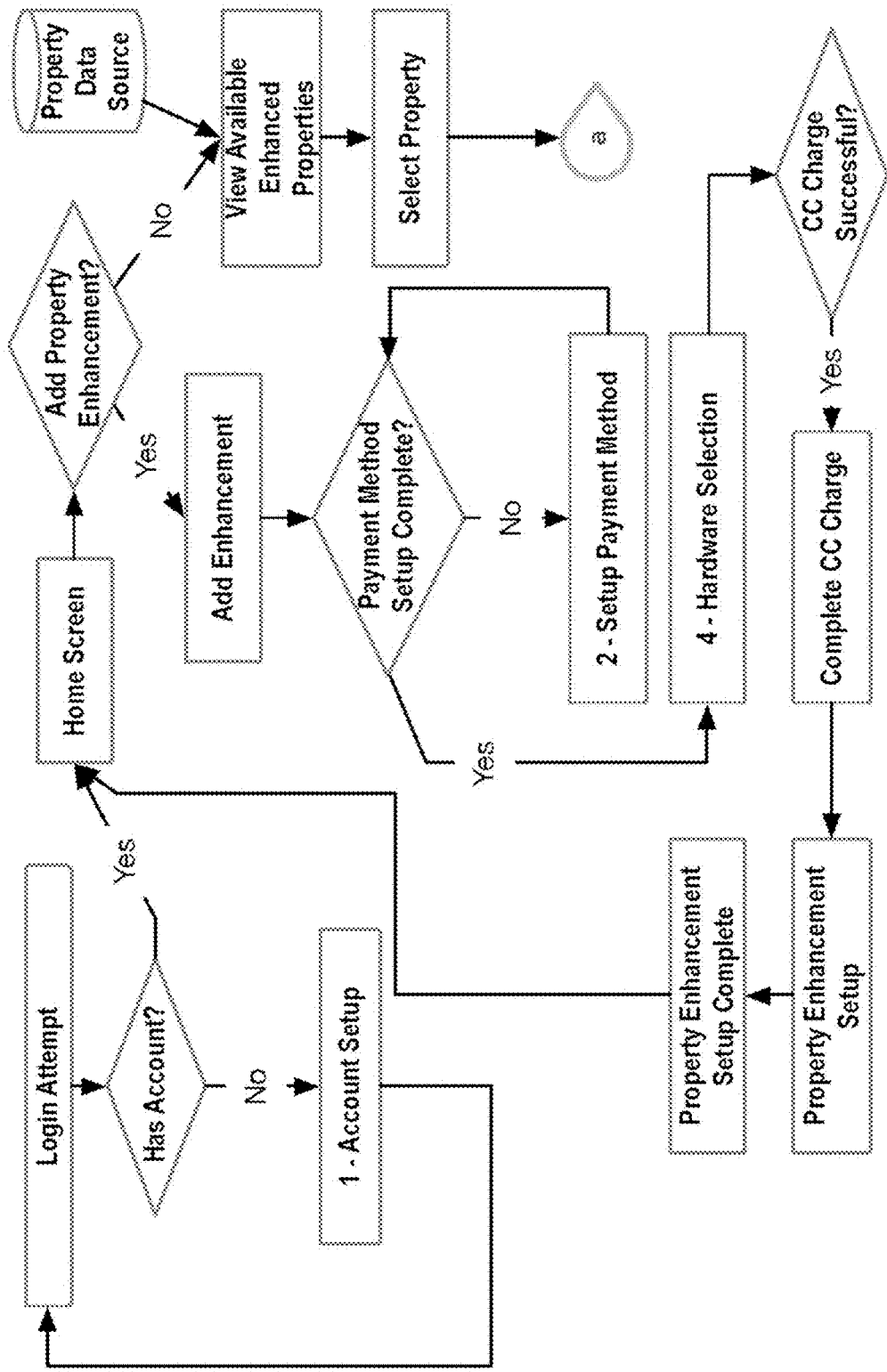
FIG. 4 shows a flow chart showing how users of the system may initially log onto the system server and establish accounts to use the system. It also shows how a property owner or broker may add this invention to a property as a property enhancement. This is because a property (in particular rental units) configured with a self-touring capability can be more valuable than a property without this feature.

FIG. 4 shows a flow chart showing how users of the system may initially log onto the system server and establish accounts to use the system. Here most of the various steps are generally implemented on the server using at least one server processor.

Figure 5:
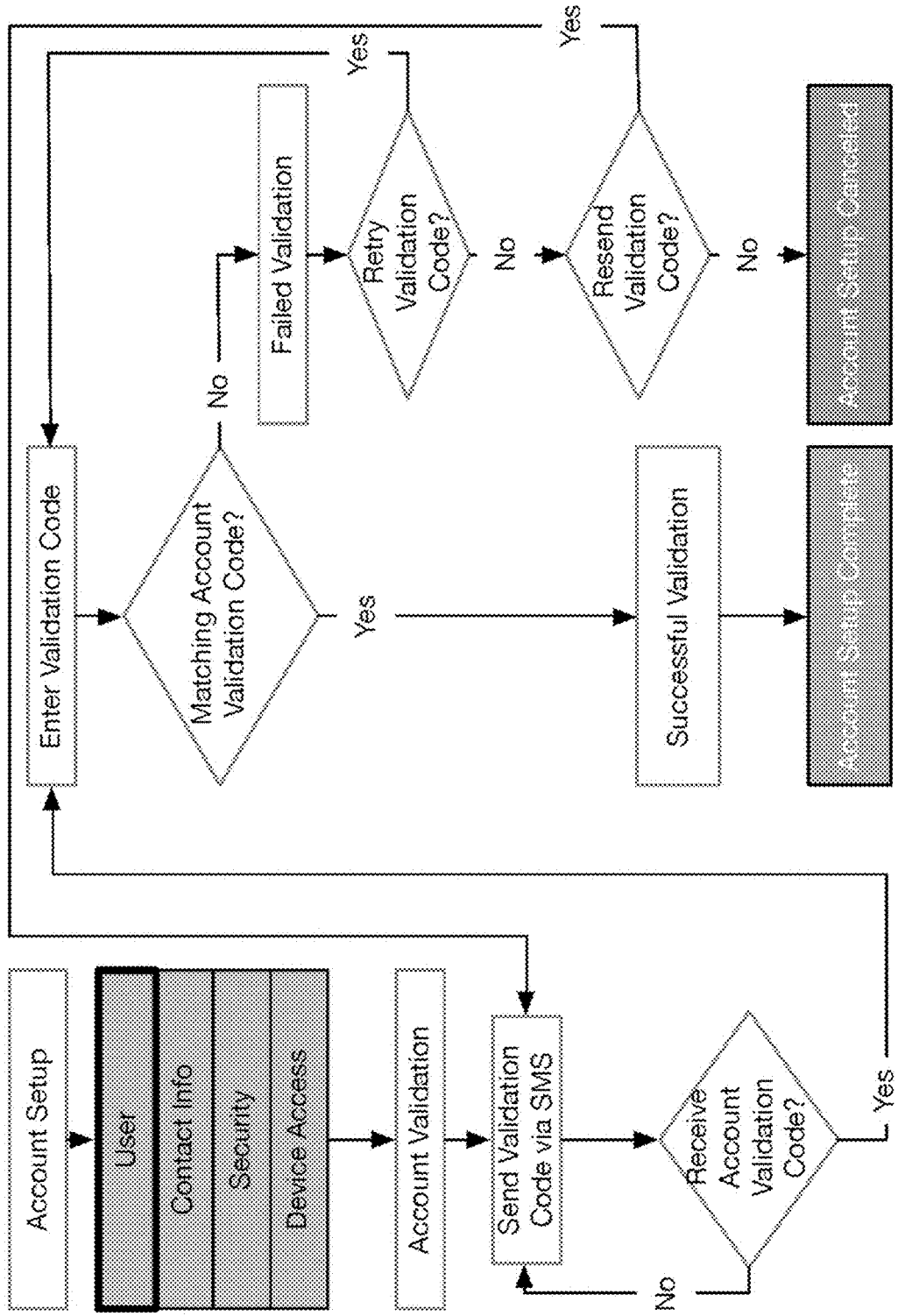
FIG. 5 shows a flow chart showing additional details of how users of the system may validate their presence and identity on the system.

FIG. 5 shows a flow chart showing additional detail of how users of the system may validate their presence and identity on the system. Here, as before, most of the various steps are generally implemented on the server using at least one server processor.

Figure 6:
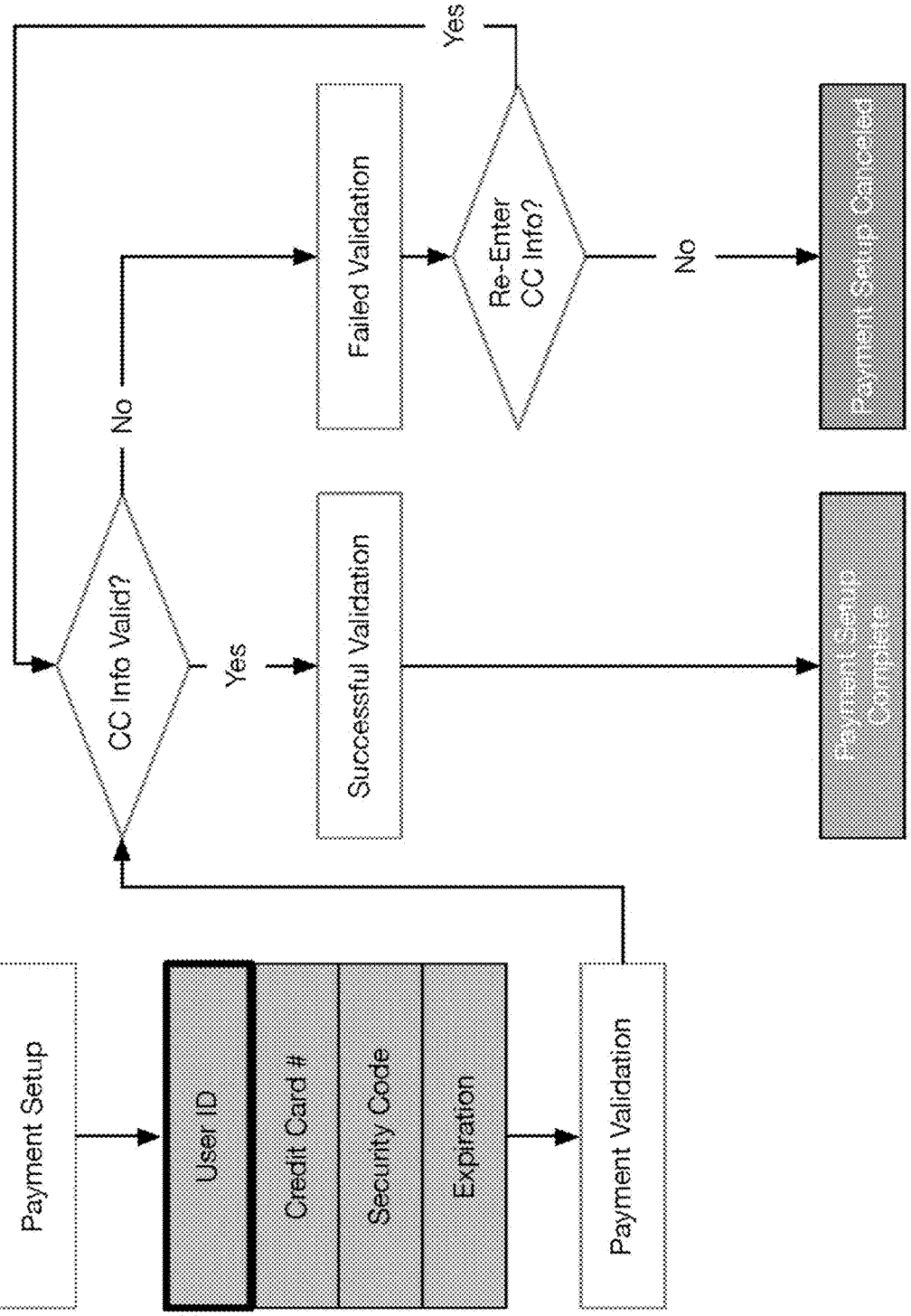
FIG. 6 shows a flow chart of how, in some embodiments, the user may provide their credit card information to assist in the user validation process and/or pay for the use of the invention.

FIG. 6 shows a flow chart of how, in some embodiments, the user may provide their credit card information to assist in the user validation process (some users may also do this to pay for the various system services). Other user identification and validation methods, such as government issued identification cards (e.g., driver's licenses) may also be used. Here, as before, most of the various steps are generally implemented on the server (130) using at least one server processor.

Figure 7:
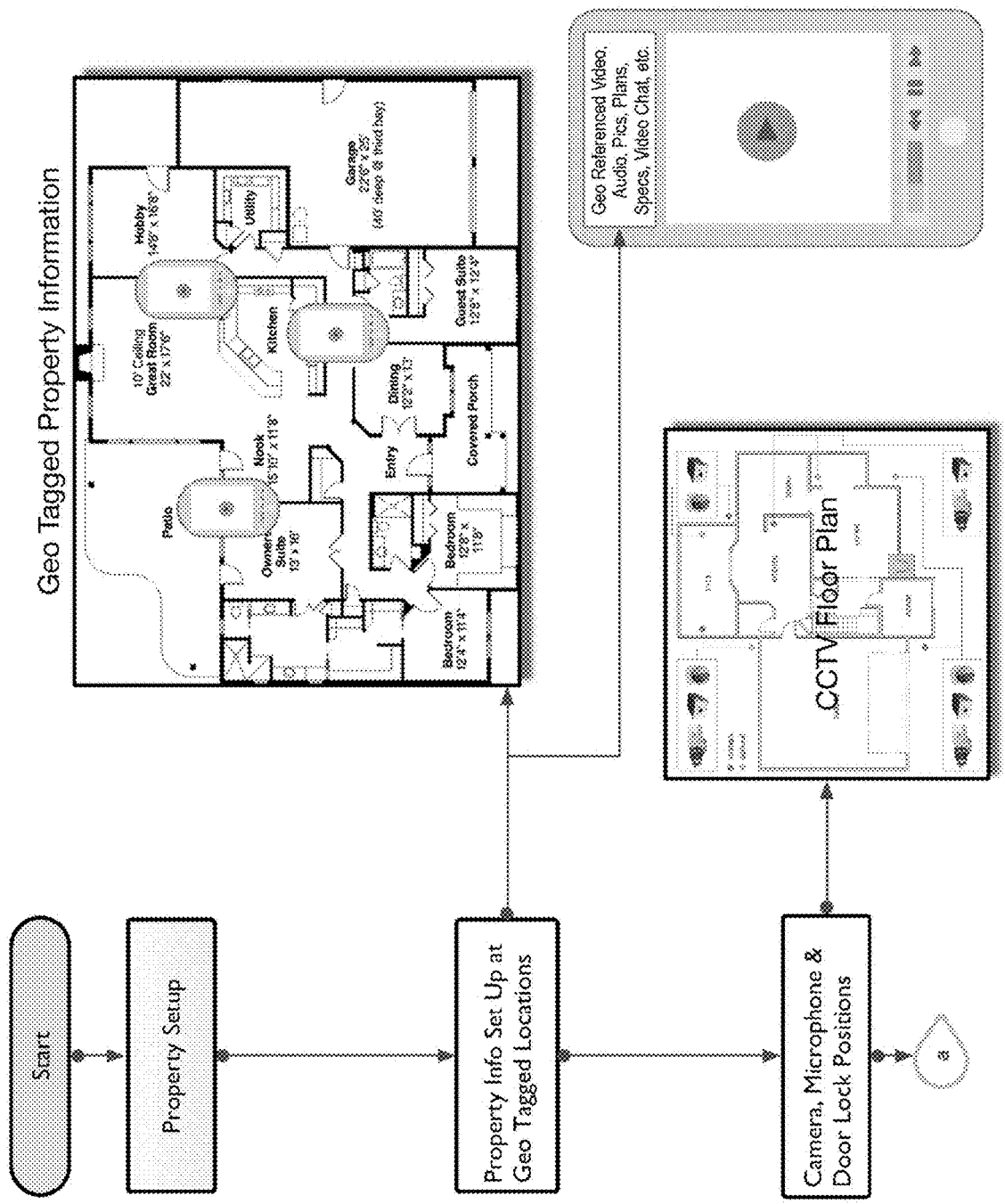
FIG. 7 shows another overview of how one embodiment of the invention may operate. This embodiment provides information to users while they are touring the property. In this embodiment, property information can first be positionally tagged (geo-tagged) either within property buildings or on the property grounds. This information can then be presented to the user's mobile device when they are within a preset proximity to a suitable geo-tag location. Furthermore, the invention then further tracks that a given specific user is within proximity to this location and can also keep track of when the user requests (e.g., downloads) that information.

FIG. 7 shows another overview of how one embodiment of the invention may operate. Here, before the user (e.g., prospective property purchaser, leaser, or renter of the property) tours the property, the persons (e.g., the owner or authorized agents) responsible for the property will set up suitable property records in the system server (130) (specifically in the server's memory or database 132). These methods were also previously described in applicant's commonly owned and invented patent application 61/621,077 (filed Apr. 6, 2012), and Ser. No. 13/844,291 (filed Mar. 15, 2013) the entire contents of which are incorporated herein by reference.

These records will often include the property location, and property layout (such as a floor plan). This will typically designate the location of various on-site sensors, electronic locks, electronic lock codes, and various locations of interest. During setup, various types of information (such as electronic messages, electronic brochures, videos) may be assigned to either the property as a whole or to various specific "geo-tagged" locations on the property. Thus, for example, when a user tours a kitchen in the property, the user's location can be detected by a kitchen mounted sensor, and sent to the server. If an appropriate "geo-tagged" set of information, such as electronic brochures on the kitchen's appliances, has been entered into the server, then when the user enters the kitchen, and this is reported by the kitchen sensor, the sever may automatically transmit this "kitchen geo-tagged" set of information, such as electronic kitchen brochures, to the user's smartphone or other user-assigned, validated, personal mobile computerized device. In the example shown in FIG. 7, at least some of the sensors may be internet-connected video cameras, here called CCTV devices. Other types of sensors, such as motion sensors, IR sensors, sound sensors, and the like may also be used.

In some embodiments, when the property comprises a plurality of rooms, and the sensors comprise a plurality of sensors disposed to monitor user presence in the various rooms, the user activities sent to the at least one internet server (130) can comprise times that the user entered and exited various rooms. Here, the internet server (130) or other computerized devices can be configured to use the times that the user entered and exited the various rooms to determine, for example, the user time spent in the various rooms, the total time that the user spent on the tour, and the route that the user took while traversing the various rooms during the tour.

Providing Information to the User During the Tour:

In some embodiments, the information that the server (130) sends to the user mobile device (such as smartphone 146) can be "geo-tagged" information—that is, information that is only provided when the user is at a particular location on the property. Here, the user-assigned validated personal mobile computerized device (146) can obtain the location of the user (140) from the at least one location-determining device (such as a smartphone GPS device, optical sensor, RFID sensor, NFC sensor, and the like). This user device (146) can then transmit that user's location to the server (130). The server can, in turn, use this user location to determine when to provide (transmit) the geo-tagged information to the user's computerized device (146).

This "geo-tagged" information can comprise nearly any type of information about the property, and can also comprise, tour information (e.g., a conducted walk-through of the property). Here the user-assigned validated personal mobile computerized device (146) can use this tour information to provide self-guided tours to the user (140). These self-guided tours can be in a sequential manner, going from key location to key location and receiving the appropriate geo-tagged information and perhaps video chat with the owner, broker or tour operator. Alternatively, these tours can be performed in a random manner in which the prospect user chooses how to tour the property. In this event, the invention can track the prospect user's movements throughout the property (see FIGS. 19A, B, and C) and their engagement with geo-tagged information. It can then present a list of key points and/or locations possibly missed by the prospect user to remind the prospect user to tour these areas of the property. In this way, it is an automated and perhaps better version of what an owner or broker walking through the property with the prospect may do in that no key area is missed. Furthermore, a tour operator can remotely track what key areas of the property have been seen or not seen and suggest to the prospect user what else they may want to see.

In some embodiments, which were previously disclosed in applicant's U.S. patent application 61/621,077 and Ser. No. 13/844,291 (now U.S. Pat. No. 9,978,109) the entire contents of which are incorporated herein by reference, at least some of this at least some information can comprise augmented reality information. Here the user can use the user-assigned validated personal mobile computerized device (146) device camera, and this augmented reality information, to provide an augmented reality display on the graphical user interface (this is also discussed in further detail later in this disclosure).

Note further that in some embodiments, this at least some information about the real-world real estate property (such as 100) can further comprise additional information about either the real-world real estate property itself and/or the real-world real-estate's local environment. This can include local demographics, prices, crime rates, school information, access to raw materials, access to transportation, and the like.

Figure 8:
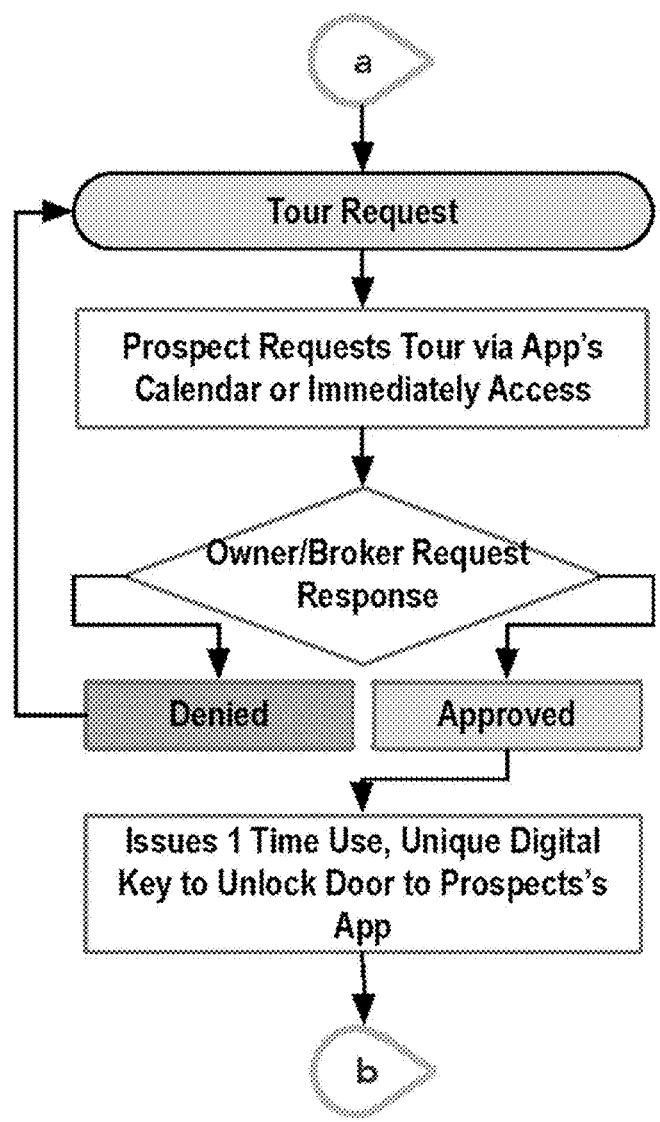
FIG. 8 shows a more detailed flowchart showing how the user may use their handheld computerized device (e.g., smartphones), or website access, according to the invention. The user may contact the server, receive tour permission, schedule one or more tours, and receive information, such as electronic digital keys, on their device that enables the user to unlock electronic lock equipped property doors to access the property.

FIG. 8 shows a more detailed flowchart showing how the user may use their handheld computerized device (146) to contact the server (130), receive tour permission, schedule one or more tours, and receive information, such as electronic digital keys, on their device that enables the user to unlock electronic lock equipped property doors to access the property. If the desired, the system may also be configured to allow the prospect-user to request immediate access to a property (for example, by contacting the owner, broker, or other agent, and requesting that they bypass the system's normal scheduling functions). Alternatively, as previously discussed, the server (130) may relay the electronic unlock commands directly to the electronic lock (110) when it receives verification that the user (and the user's user-assigned validated personal mobile computerized device) is at the electronic lock equipped door.

Figure 9A:
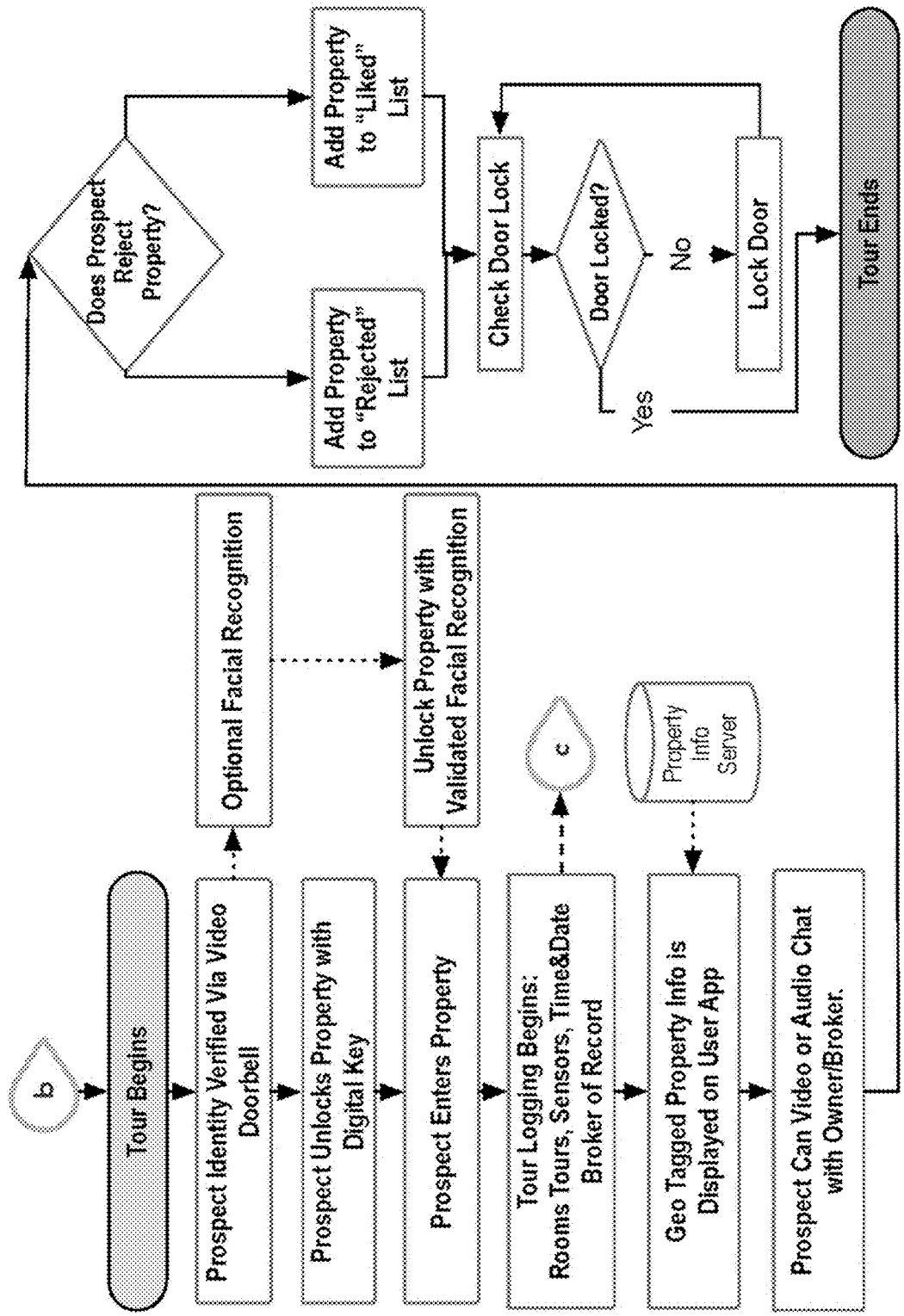
FIG. 9A shows a more detailed software flow chart showing how the server software may act during a tour. In some embodiments, the user can be verified via video link through a camera at the entry point. Other embodiments may use automated facial image recognition methods. Still other embodiments may omit any requirement for visual identification.

FIG. 9A shows a more detailed software flow chart showing how the server software may act during a tour. Assume here that the user is potentially interested in purchasing, renting, or leasing the property, and is thus termed a "prospect" in real estate terminology. In this example, at least one of the property sensors is a video equipped doorbell (such as 116) that is mounted near the location of the electronic lock (110). The system server (130) can be configured, in some embodiments, to additionally or alternatively take image data from this video door bell (or other video sensor configured to monitor the door area), and to perform additional user verification steps by using image recognition technology to confirm that the user's facial features match user reference information available to the server (such as the user's previously entered driver's license photo). Once the user is verified, in this example, the server (130) transmits a digital key to unlock the electronic lock to the user's handheld computerized device (smartphone 146), and the lock (110) is unlocked.

During this tour, as previously discussed, various sensors on the property keep track of the user (prospect) activities during the tour, such as which rooms the user visits and the various times that the user visits the room. This information is typically stored in the server's memory (132) for later analysis and alternatively may be transmitted in real-time to another device, such as a broker or property owner's or tour-guide's computerized device, to enable them to remotely monitor the progress of the tour (see FIG. 3A, 134, 136, 138). As previously discussed, if appropriate geo-tagged information has been stored in the server (130), then as the user enters various pre-designated locations (such as rooms), the system server may transmit this geo-tagged information to the user's smartphone (146). As previously discussed, the system can also be configured to facilitate optional video or audio chats between the user (prospect) and the owner, broker, or other designated agent (see FIGS. 16A and 16B).

In some embodiments, the system may be configured to automatically ask for immediate user (prospect) feedback on the property. Here, the server can automatically transmit a questionnaire or survey to the user's smartphone, and the user prompted to give feedback immediately. An example of such questionnaire methods is shown in FIG. 9B.

Other options also exist. In an alternative embodiment, the prospect may arrive at the property and start a tour app on the prospect's smartphone. If the prospect has previously signed up with the system server using the tour app, then the prospect can self-identify using the smartphone biometric sensors (smartphone facial recognition, smartphone fingerprint sensors 168, etc.). The tour app can then transmit confirmation of the prospect's identity and location to the system server, and the system server can then unlock the appropriate property locks. Alternatively, if the system server has previously transmitted the proper unlock codes to the tour app, then the tour app itself may transmit the appropriate unlocking codes to the relevant property locks directly.

Figure 9B:
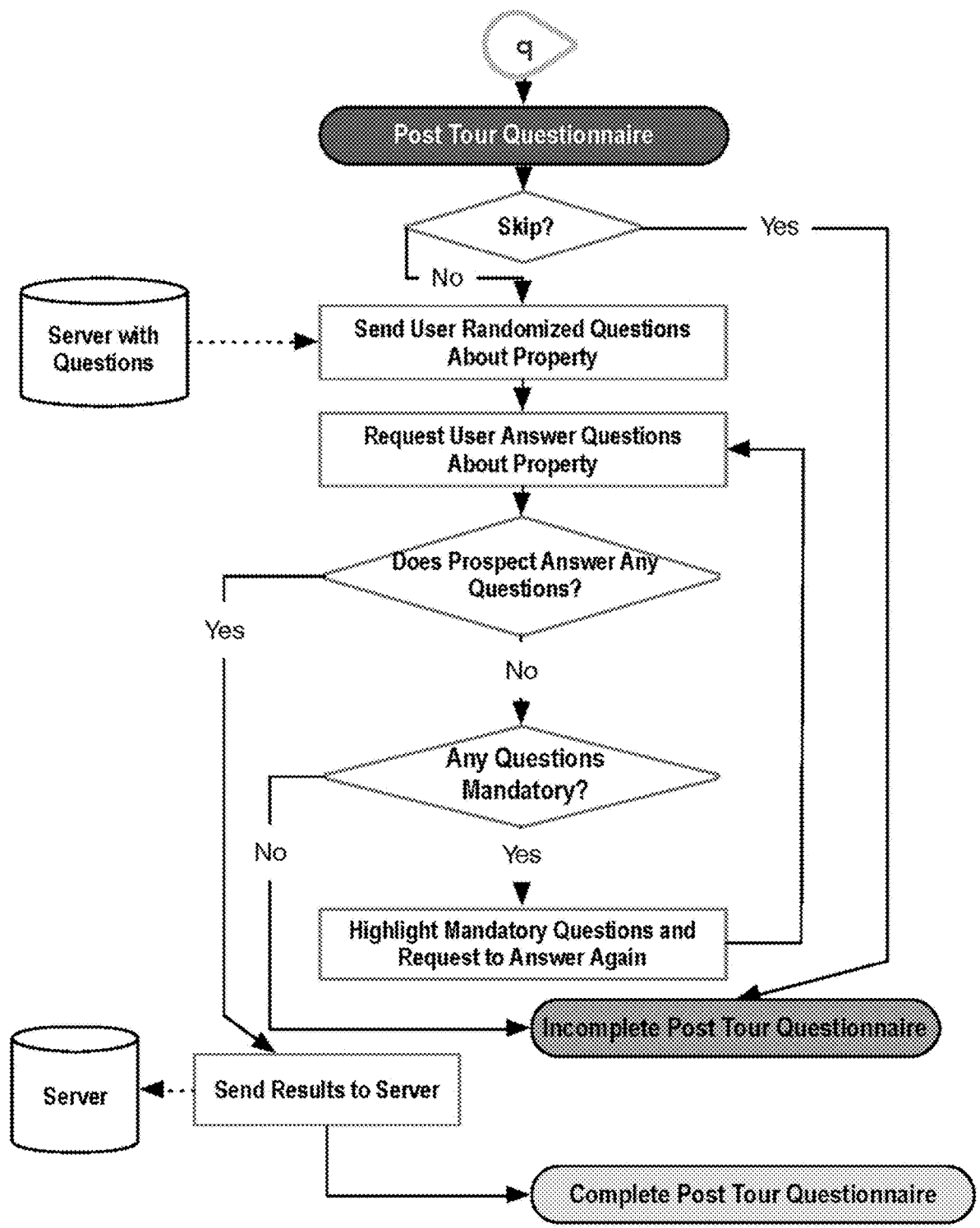
FIG. 9B shows that in some embodiments, the system may automatically transmit surveys/questionnaires to the various user computerized devices and record the results in the server's memory (or elsewhere).

FIG. 9B shows that in some embodiments, the system may also be configured to automatically transmit surveys/questionnaires to the various user computerized devices, and to record the results in server memory (or elsewhere).

In other embodiments, this feedback may only be transmitted at the discretion of the user. In either event, once the server is informed about the user (prospect) evaluation of the property, this can be stored in server memory (132) or transmitted to other devices such as (134). In any event, regardless of if user feedback is obtained or not, after the tour (such as evidenced by sensor reporting that the property is again vacant), the server may additionally query additional lock sensors to ensure that the door (110) is locked, and or take appropriate steps (either sending locking commands to the lock, or error messages to the owner, broker or authorized agent, such as FIG. 3A 136) that the door has been left open, and that and manual intervention to close the door may be required.

Note that in some embodiments at least some of the user activities while the user is present on the real-world real estate property can be stored in a user activity database (such as in server memory or database 132). Here, the invention may use at least one processor (which may be a server (130) computer processor, or an external computerized device processor such as a device 134 processor) to query this user activity database (assume here that this is database is at least initially stored in 132) and produce any of graphical and analytic reports based on these user activities. These queries can include tour durations, tours per time-period, floor plans most toured, as well as other analytics and graphs.

Figure 10:
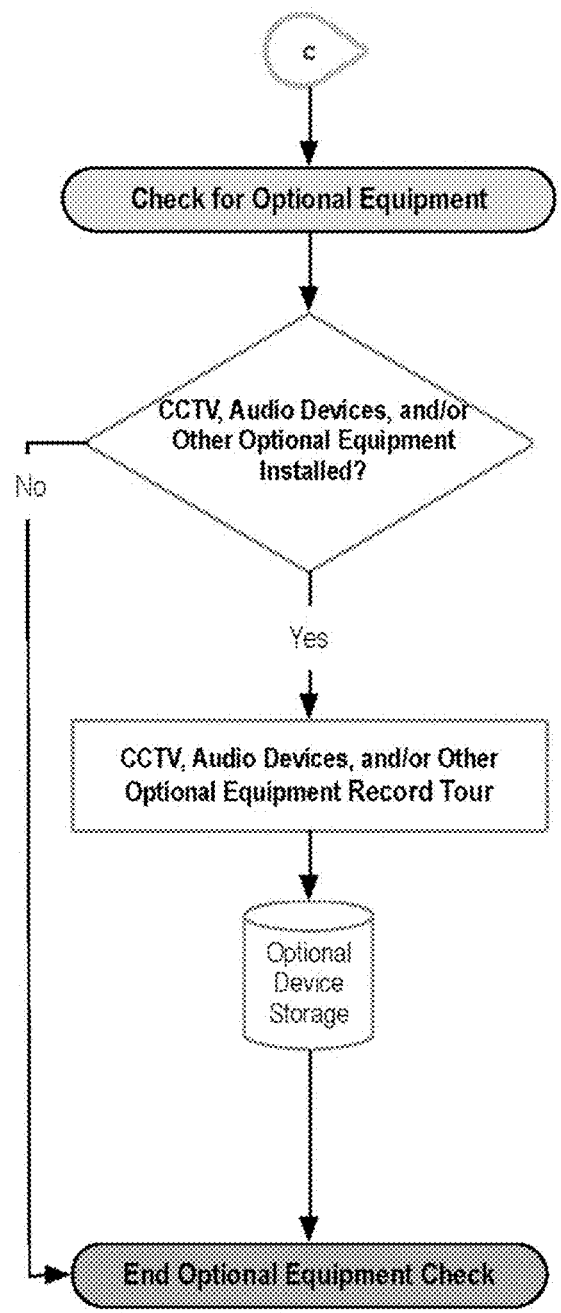
FIG. 10 shows a flow chart of how the server can automatically query the various sensors and other optional equipment at a given real estate property. In this embodiment, the system stores various user activities (as determined by the system sensors) in memory for later analysis.

FIG. 10 shows a flow chart of how the server can automatically query the various sensors and other optional equipment at a given real estate property, and store various user activities (as determined by these various sensors) in memory for later analysis.

As previously discussed, even if no optional equipment (sensors) is installed at a given real estate property, the server can interface with the tour app on the user's smartphone, and acquire user activity information through the smartphone tour app. As previously discussed, the smartphone tour app can be used, optionally in conjunction with any property located RF devices such as WIFI or Bluetooth devices, GPS receivers, and the like to report on user movement throughout a property throughout a tour. Additionally, by interfacing with additional Smartphone devices such as smartphone magnetometer sensors (Hall effect magnetometers), or cameras, information about user orientation during a tour may also be reported to the server for later analysis.

Handling Electronic Documents:

The invention is also inspired, in part, by the insight that the efficiency of the real estate analysis and management process can be greatly facilitated if the system is configured to handle a wide variety of different electronic documents. Some of these electronic document methods, which may be implemented as part of the previously discussed tour app, or by other methods, are shown below. In addition to providing a valuable service to the user, such electronic document methods can also provide additional data for user preference analysis as well.

Figure 11:
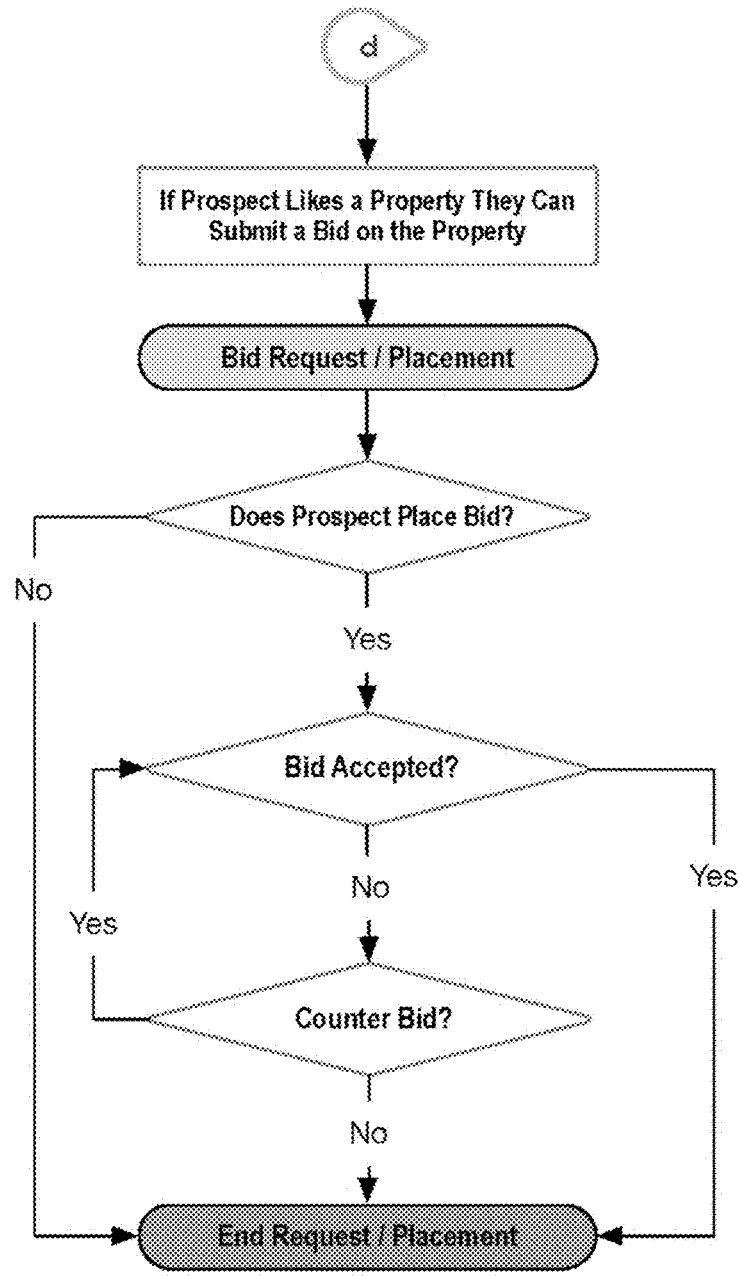
FIG. 11 shows a software flow chart. This provides details of how the server can pre-populate and transmit various electronic documents to the user's mobile computerized device (e.g., smartphone) to streamline various transactions. For example, the user may use this process to submit a bid for the property. The owner or broker may then accept or counter such a bid.

FIG. 11 shows a software flow chart providing details of how the server can pre-populate and transmit various electronic documents to the user's smartphone (either to the tour app, or to other smartphone applications) to streamline various transactions. In this example, the electronic documents can be user bids and counter-offers on the property of interest.

Here, for example, at least some information about the real-world real estate property can further comprise at least one fillable form electronic document. In this embodiment, the internet server (such as 130) can use previously stored information on both the user (140) and the real-world real estate property (100) to automatically pre-populate at least some portions of this fillable form electronic document, thus creating one or more pre-populated fillable form electronic documents. These documents can include housing inspection documents, as well as other types of documents such as bids, contracts of any type. The documents may be from multiple vendors, brokers, bankers, or other professions, as desired. The server (such as 130) can transmit these pre-populated fillable form-field electronic documents to the user-assigned validated personal mobile computerized device (146).

In some embodiments, such as in cases when it is desirable to transmit geotagged data or multimedia to the user, the internet server can be configured to use previously stored information on any of the user and the at least one real estate property to automatically pre-populate at least one electronic document. This server can then transmit these pre-populated electronic documents to the user's personal mobile computerized device, where it then can be displayed. Here, the server may be configured to use information pertaining to the user's present location and/or orientation to control the delivery of this previously stored information.

Here, at least depending on appropriate user permissions, some of this data may be aggregated and used for statistical analysis of user preferences.

The user-assigned validated personal mobile computerized device (146) can be further configured to securely receive this pre-populated fillable form electronic document, as well as to receive input from the user (140), thus creating a user-edited pre-populated fillable form-field electronic document. The device (146) and/or server (130) can then transmit this user-edited pre-populated fillable form electronic document to the desired internet destination.

Figure 12:
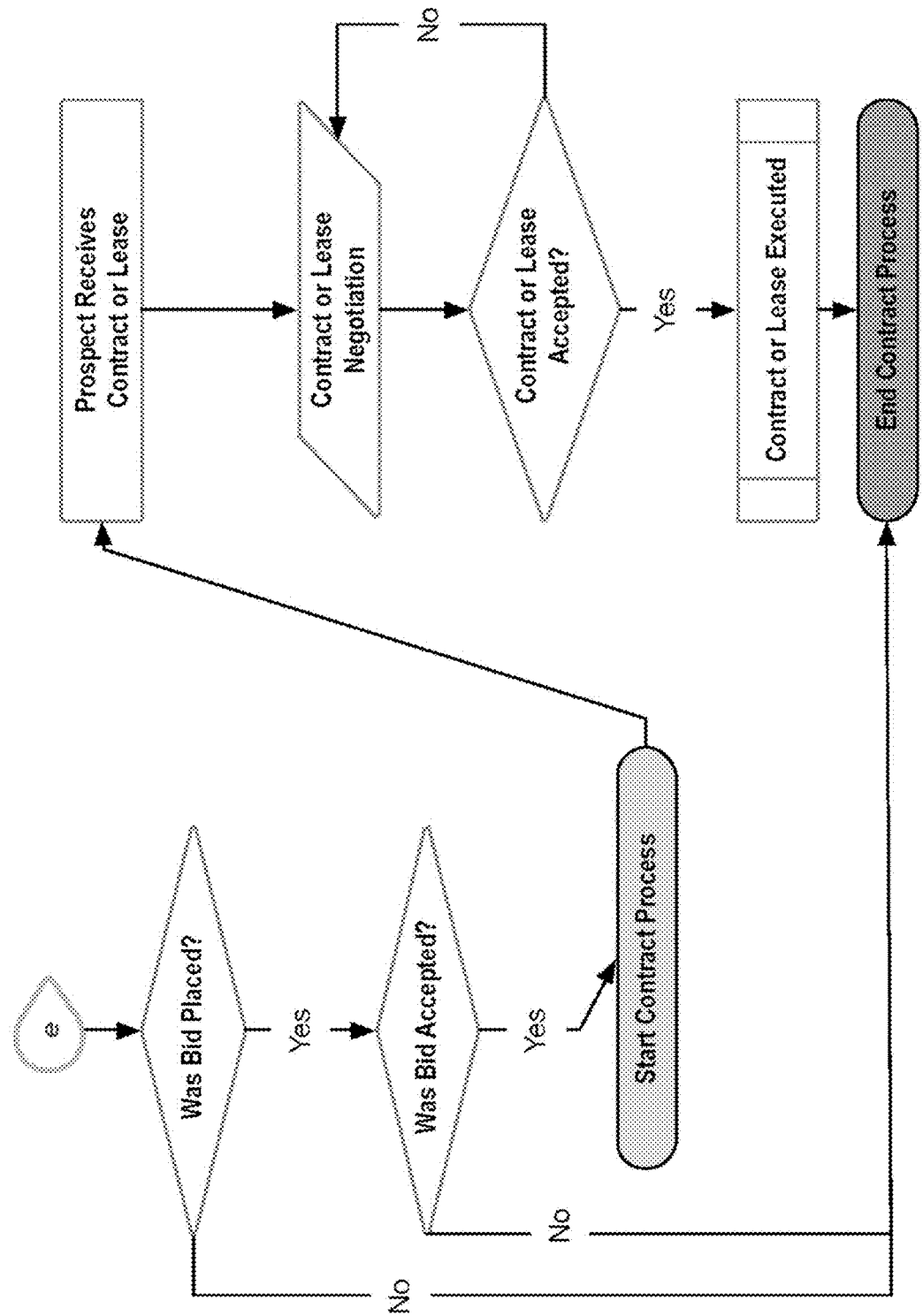
FIG. 12 shows a software flowchart providing more details of how the server can pre-populate and transmit various electronic documents to the user's smartphone to streamline certain transactions.

FIG. 12 shows a software flowchart providing more details of how the server can pre-populate and transmit various electronic documents to the user's smartphone to streamline various transactions. Here, as discussed above, in addition to electronic bid documents, other documents such as real estate sales or leasing agreements may also be handled by the system.

Figure 13:
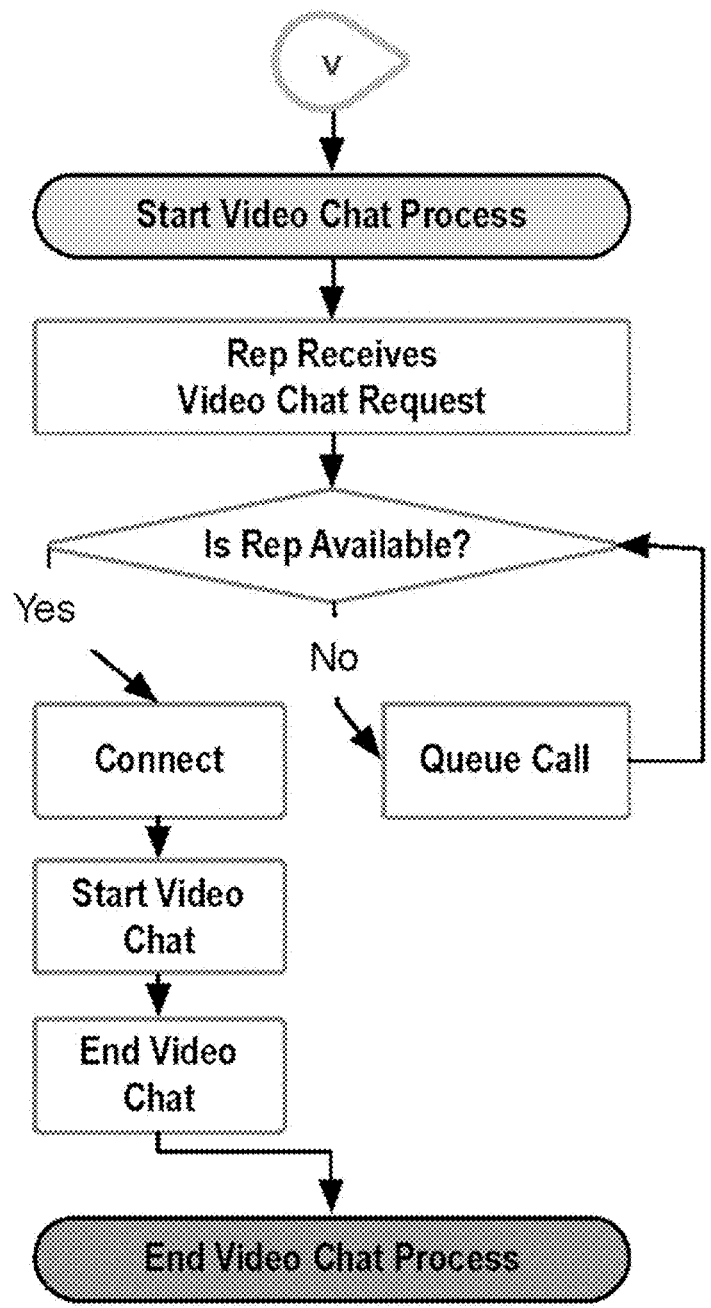
FIG. 13 shows a software flowchart showing how the system can optionally also handle audio or video chat requests between the user (prospect) and the property owner or agent of the property owner.

FIG. 13 shows a software flowchart showing how the system can optionally also handle audio or video chat requests between the user (prospect) and the property owner or agent of the property owner. In a preferred embodiment, such audio or video chat requests may also be implemented using the previously discussed smartphone tour app. However, this is not intended to be limiting, and other applications (software) and devices may also be used for these purposes.

Figure 14:
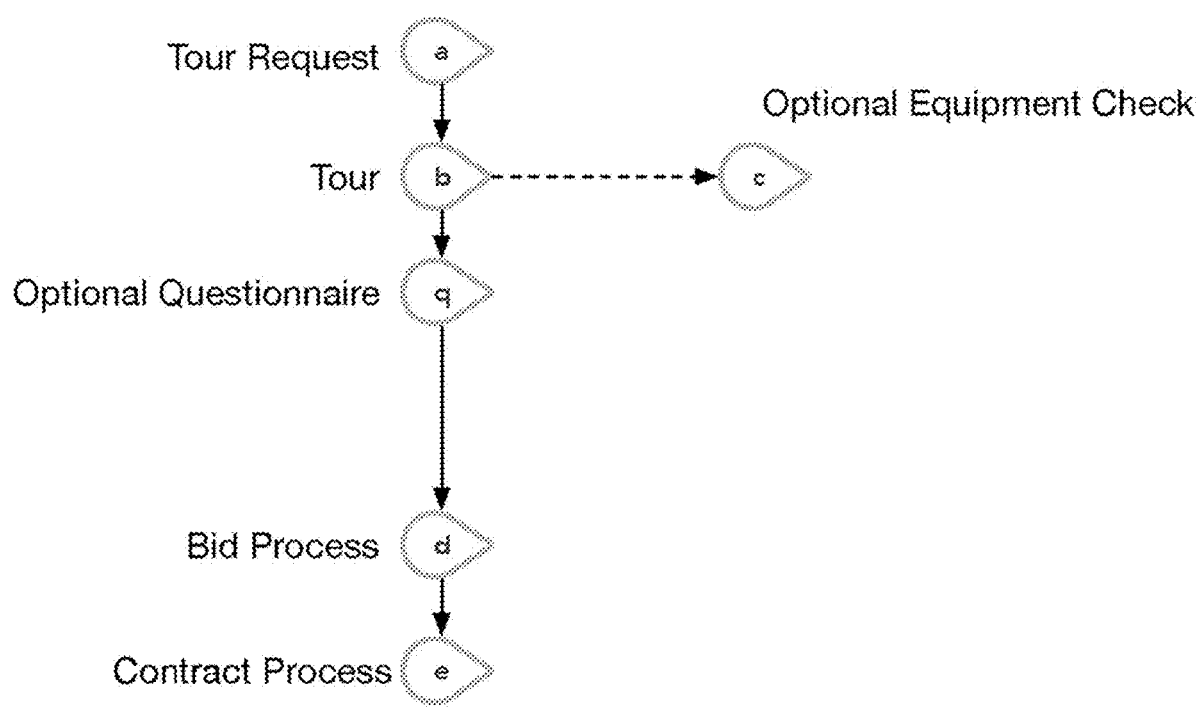
FIG. 14 shows a high-level overview of how, in some embodiments, the system can progress from a tour request up through an exchange of electronic documents. These can include bidding and other types of contractual documents.

FIG. 14 shows a high-level overview of how, in some embodiments, the system can progress from a tour request, optionally transmit and receive tour questionnaires (see FIG. 9B), and proceed up through an exchange of electronic documents for various contracts.

Figure 15:
FIG. 15 shows that in some embodiments, the server may aggregate sensor data from multiple properties and may assemble this data into a dashboard of historical or real-time data. This allows multiple user tours over multiple user properties to be viewed simultaneously. Additionally, in some embodiments, this dashboard can also show what tours are currently active or pending. In some embodiments, this dashboard can also show if a property has CCTV (e.g., video cameras or closed-circuit television) and which CCTV cameras are currently displaying video.

Dashboards of Multiple Tours:

FIG. 15 shows that in some embodiments, the server may aggregate sensor or smartphone tour app data from multiple properties and may assemble this data so that, when displayed on a computer display or computer graphical user interface, a dashboard of historical or real time data is revealed so that multiple user tours over multiple user properties can be viewed simultaneously. This dashboard data can then be transmitted to another computerized device (here a laptop computer) for viewing. Note that this dashboard data may be provided as a web-based application (e.g., website), and it may be viewed on non-mobile computerized devices (e.g., desktop computers) as well. There is no requirement that the remote owner, broker, or agent (136) use a mobile device while working remote from a given property.

In this embodiment, the system may be configured to graphically present a dashboard of real-time information about a plurality of scheduled tours of a plurality of internet-connected real-world real estate property. These can be presented simultaneously on at least one computer screen as desired.

This embodiment enables a property owner/broker to handle multiple tours at once. In FIG. 15, the scheduled tours are on the left side. The active tours are in a lighter shade, and the active site video cameras are also indicated by a light-colored dot. If a property does not have any video camera sensors (here called CCTV), this is also indicated. The system can optionally also enable various video chats between the owner/broker and various users (prospects) during their tours of various properties.

This dashboard graphical user interface may also be used to output information on average user positions and/or orientations during a tour. This way, a dashboard user, be it a market research user, tour operator, or other individual, may, for example, view "heat maps" of average user interest for one or more properties in real-time or as accumulated.

Figure 16A:
FIG. 16A shows that in some embodiments, the server-generated dashboard can enable video chats between the dashboard user and the user touring the property (prospect). The dashboard user can continue to monitor other tours on other properties during a given chat.

FIG. 16A shows that in some embodiments, the server generated dashboard can also be configured to enable the user touring the property (prospect) and the dashboard user (owner broker) to video video-chat, while the dashboard user can continue to monitor tours on various other properties.

Figure 16B:
FIG. 16B shows that if multiple calls from multiple users touring different properties (multiple prospects) come in at once, then the waiting calls may be automatically queued in sequence by the server.

FIG. 16B shows that if multiple calls from multiple users touring different properties (multiple prospects) come in at once, then the server may also be configured to queue the calls in sequence, and optionally also provide waiting messages to the waiting (queued) calls.

Monitoring Users During a Tour

In general, users may be monitored by using any combination of property-associated sensors (e.g., sensors that remain on the property after the visitor leaves) and mobile device-associated internet-connected sensors. The latter will generally be sensors built into smartphones and other handheld computerized devices, such as smartphone cameras, GPS sensors, movement sensors, orientation sensors, WIFI sensors, Bluetooth sensors, and the like. These mobile device-associated internet-connected sensors will generally be part of a handheld computerized device (often a smartphone) carried by the visitor.

Figure 17:
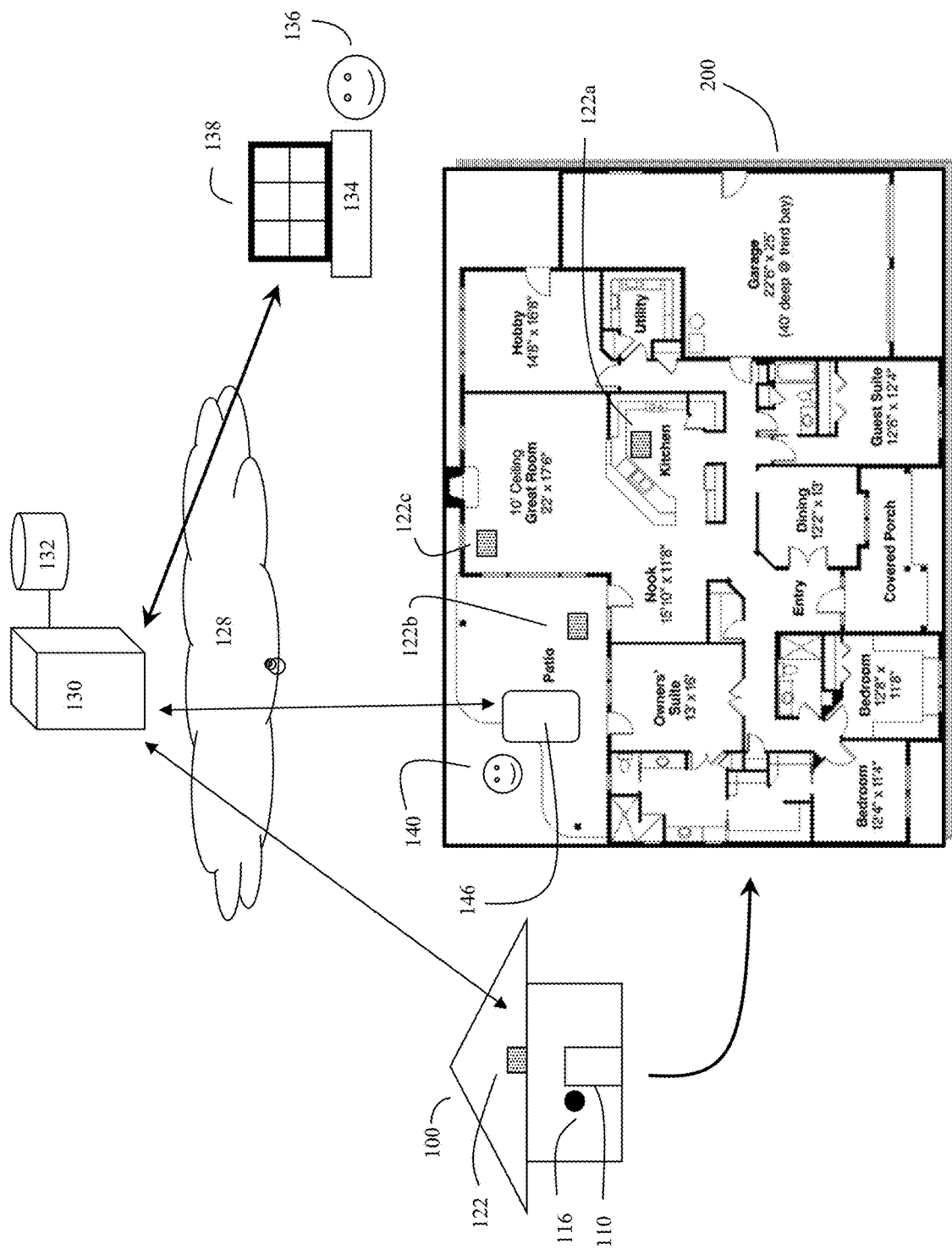
FIG. 17 shows how in some embodiments, the invention may monitor the positions and/or orientation (the direction the person is facing) of various persons on a real-estate property. This orientation can b relative to different pre-designated locations of interest on the property. For example, is the person facing a kitchen, or facing a given window, etc. In some embodiments, this data can then be used to analyze the behavior of these individuals. This data can be accumulated over a plurality of individuals and tours.

FIG. 17 shows how in some embodiments, the invention may monitor various persons' positions and/or orientation on a real-estate property relative to different pre-designated locations of interest on the property. The system can use this data to analyze the behavior of these individuals. In this figure, assume that user (140), previously discussed in FIG. 3A, has now entered property (100), and in (200), we are currently viewing the floor plan of property (100).

Here assume that the previously discussed at least one property associated sensor (122) is a plurality of sensors (122a, 122b, 122c), each positioned to monitor different portions (rooms, locations of interest) in the floor plan of property (200). Further, assume that server (130) has previously been configured to recognize that at least kitchen (202) is a "location of interest". User activities, including positions and even various user(s) orientations, can be monitored by a kitchen positioned sensor (122a). This can be many types of sensors, but for simplicity, in this example, assume that 122a is an overhead camera with enough resolution to view the user, determine the user's location in the kitchen, and determine (with suitable computer vision software) which way the user is facing. Alternatively, user position and orientation during a tour may also be acquired using the previously discussed smartphone tour app.

As the user (140) tours the house, various house (property) associated sensors (such as 122a, 122b, 122c) or tour app data can keep track of when the user enters and exits a particular location. This can also be supplemented by optional position data reported by user smartphone (146) (or other handheld computerized devices) to server (130).

In this example, assume that the kitchen is a bit unusual in that it may be painted in a somewhat leading-edge color scheme, or may have some unusual higher end appliances in it, and the owner is trying to judge if the users either like the kitchen "location of interest". Here "like" is estimated by determining if the user spends more or less time than average in the kitchen, and/or if the user position faces the appliances (which themselves can be designated as points of interest) more or less than average. In some embodiments, the users may also be given the option of explicitly voting on certain locations or features as well, such as by implementing a like/dislike feedback option (such as a button) on the user smartphone's graphical user interface while the user is near or oriented at the location of interest. The smartphone can then transmit this user feedback to the server (130), and correlate this data with the various locations of interest.

The server (130) can be configured to keep track of the user time spent in the kitchen, as well as number of return visits to the kitchen, user time spent oriented towards or away from the appliances, the distance between the user (140) and the appliances, and so on. The server (130) or other computerized device can also compare this user data to average values from other properties and other tours. This analysis will give the owner or agent (136) information, in this example, as to if the users are attracted or repelled by the leading-edge color scheme, and are noticing and are attracted or repelled to the high-end appliances.

This can provide valuable information. For example, if users spend less time than average in a kitchen point of interest, this can provide quantitative evidence that the kitchen needs to be upgraded. Note that although this functionality is highly useful in a "prospect only' tour visit to an otherwise vacant property, this method may be used in other situations, such as open houses and various types of focus groups, as well.

Put alternatively, this user tracking embodiment can itself be another computerized method, here a method that is particularly useful for simultaneously monitoring a plurality of "prospect" user touring a plurality of different properties, but which can have other applications as well.

Here, the method uses at least one real-world real estate property configured with at least one internet-connected sensor (such as 116, 122) to monitor activities of a plurality of real-world visitors (140, here "visitor is a human user, who may or may not be a "prospect") to this (or other) real estate property, and report on the activities of this plurality of visitors to at least one internet server (130).

As before, at least some of these visitors (140) will be carrying user-assigned personal mobile computerized devices (e.g., smartphones, 146) that also wirelessly transmit unique identification codes (to server 130) that can be traced to specific visitors and specific visitor characteristics. Here to better track the users, usually before the touring begins, the server memory (132) may store various designated locations of interest (such as locations on the property, kitchen appliances, bathrooms, and so on) on the real estate property of interest (such as 100, see also floor plan 200), in the server's memory (132). Alternatively, these locations of interest may be added later, after the user activity data has already been recorded. In other embodiments these same measurements and data points can be utilized in other types of real estate such as retail, office, warehouse and manufacturing, as examples, and any type of real property.

Here, assume that each visitor will also have at least an orientation corresponding to the visitor's field of view. This can, for example, correspond at least to the front of the user's head versus the back of the user's head, which can usually be easily distinguished by various types of sensors such as cameras and automated image recognition sensors, and other types of sensors).

Further, the various (least one) internet-connected sensor(s) (here property associated sensors, such as 122a, 122b, 122c) can be configured to cover at least one of the designated locations of interest. This method will use at least one processor (which can be a server computer processor or other processor located elsewhere, such as on device 134) to determine, as a function of time, distances between the visitors and the various designated locations of interest. In a preferred embodiment, the system will also determine the orientation of the visitors relative to at least some of the designated locations of interest.

Here the server (130) will typically identify the various visitors (146) by, for example, receiving the wirelessly transmitted unique identification codes, and may optionally also determine the specific visitor characteristics for at least some of the visitors (using the unique identification codes, or by other visitor identification data).

In some embodiments, the server database or memory (132) or memory may be located elsewhere (such as on device 134) will accumulate information (statistical data) on the locations and/or orientations and characteristics of the various visitors. This will often be over multiple visitors and relative to at least some of the different designated real-estate locations of interest. Here the system will also determine, for at least some of these visitor characteristics, if at least some locations of interest correlate with statistically higher or lower distances and/or orientations between at least some visitor characteristics and at least some designated locations of interest. Put alternatively and more simply, the system can determine if some visitors preferentially visit or avoid specific locations of interest. This can allow the system and various owners or owner agents (136) to determine what parts of the property the visitors (which can be prospects) tend to react either favorably or unfavorably.

The above monitoring system need not only be used to monitor prospects during tours of real estate. The system can also monitor park visitors, shoppers in a store, and so on. However, the above methods are beneficial for monitoring prospects during at least one scheduled tour of at least one internet-connected real-world real estate property.

Optional LLM Methods

In some embodiments, the above statistical data, and at least one computerized Large Language Model (LLM), may be used to produce automated recommendations regarding various types of real estate property. This real estate property can include any of the actually toured real-world real estate properties, such as a property that a given visitor may be touring in real-time. The LLM methods can also be generalized to apply to any real estate property, including not-toured real-world real estate properties, or even planned or virtual real estate properties.

Note that in these LLM embodiments, use of the above statistical data is optional. It is anticipated that such LLM will often be trained in advance with an unusually large amount of data relevant to real estate, such as governmental and private real estate records, real estate construction and renovation techniques, lists of materials, equipment, and vendors typically used in real estate, lists and contact information on vendors, real estate law, and the like. As a result, such "real estate optimized LLM" can be very valuable for making automated real estate recommendations regardless of if they additionally use the invention's (often not generally available) statistical information. Thus, applications of such LLM for generating real estate recommendation without using such statistical information is not disclaimed. However, in this disclosure, we will focus on the particular advantage of supplementing such LLM methods with the additional types of statistical data provided by the present invention.

Asking Survey Questions During a Tour:

In some embodiments, the device analyzing the data (such as server 130) can use previous determinations of statistically higher or lower distances and/or orientations between at least some visitor characteristics and at least some designated locations of interest to automatically transmit questions to visitors (140) carrying user-assigned personal mobile computerized devices (146). This can be either during a tour or after the visitor conducts a real estate property tour (such as 100, 200). Here, server (130) can also be used to receive answers to these questions. This question-and-answer data can be correlated with at least some of the user position and/or orientation data.

For example, user questionnaire responses can be further correlated with other findings, such as the system's determination of statistically higher or lower distances and/or orientations of the visitors with various locations of interest.

The questionnaire response data can also be correlated with at least some of the visitor characteristics and at least some of the designated locations of interest. For example, the system may report or discover if tour prospects (146) start to avoid white kitchens. The system may also classify users according to their question responses and determine if some users prefer some locations of interest over others.

Other Methods of Determining User Orientation:

Modern smartphones contain hall effect magnetometer devices, which act as a built-in compass that can be used to determine the smartphone's orientation. In some embodiments, the user smartphone "tour app" may further be configured to use such hall effect magnetometer devices to determine changes in the relative orientation of the user's smartphone as the use tours the property. Although users can, of course, shift the positions of their smartphones during a given tour, this hall effect direction data can be used, at least in conjunction with occasional video data from a tour site, to help estimate user orientation during times when the user may not be in video camera range. For example, if video data at one location shows that the smartphone is in the user's pocket, as well as the orientation of the user from facial recognition, then the offset between the tour app's reported direction of the smartphone and the facial recognition estimate of the user orientation can be calculated. This offset can be used to approximate the user orientation when the user passes out of camera range.

As previously discussed, in some embodiments, it may be preferable to enable certain features to encourage users to upload more data (such as images) to the system servers.

Augmented Reality Embodiments

FIG. 18A shows how in some embodiments, the server may store various virtual objects from various sources. Upon user demand from a user smartphone or other computerized device, transmit various virtual objects and associated object information to the user computerized devices. The user's computerized device (either by the "tour app", or a different type of software app) may be configured to take real-time camera images (and optionally also obtain light detection and ranging, e.g., LIDAR, measurements) of certain locations on the property, combine real-time images with the transmitted virtual object information, and provide augmented reality displays of these virtual objects in the context of the property or portion of the property. These augmented reality displays may be displayed on either a standard mobile device display screen, or on an augmented reality headset (or augmented reality glasses). The system server may be further configured with suitable API and a database of different virtual objects and associated object information from multiple sources, such as suppliers of actual real-world objects and services that are being represented by the various virtual objects and associated virtual object information. This can streamline the ability to rapidly configure the real estate according to the desires of the persons doing the configuration.

About Augmented Reality Headsets and Virtual Reality Headsets

Examples of suitable augmented reality headsets and virtual reality headsets (see FIG. 3C), sometimes often called mixed reality headsets, include the Microsoft "HoloLens" system, the Meta "Quest" system, and the Apple "Vision Pro" system. These systems typically comprise at least one (usually two) eye-mounted displays (152a, 152b), at least one outside-oriented camera configured to image the outside world (166c), at least one inside-oriented camera configured to image the direction of the user's eye gaze (166a, 166b), at least one processor (154), and at least one wireless transceiver (166), such as a Wi-Fi transceiver which in turn can be configured to connect to the internet (128).

Such devices can be used by real-world visitors (140) to a real-world real estate property. They receive images of the real-world property from the outside camera (166c), record the user's position and eye gaze direction with the inside-oriented camera(s) (166a, 166b), and produce augmented reality views of the real-world property by superimposing images of various virtual objects on the images of the real-world property.

Such devices may also be used by virtual visitors to a virtual copy of one or more real-world real estate properties. In this situation, a virtual copy of a real-world real estate property (100, 212) can be obtained by using at least one camera (FIG. 3C, 220) to produce a plurality of images of this real-world real estate property and then using at least some of these images to produce at least one virtual copy of said at least one real estate property. This virtual copy may be stored on board the at least one internet server (130) and then downloaded to a suitable headset (150a) or other viewing device as needed.

Often, these images may be stitched together by software to produce a seamless or nearly seamless virtual copy of the real-world real estate property, which may be stored on a suitable server (130) and uploaded to the headset (150a) as desired. Examples of suitable systems for producing such images include the LiDAR equipped Pro3 camera produced by Matterport corporation, and the Insta360×4 and subsequent derivative products, produced by Insta360 Corporation.

In addition to producing high-resolution images of its surroundings, the Pro3 camera is equipped with a high-precision LiDAR system that, by taking millions of precise LiDAR readings of its surroundings, can produce virtual copies with precise dimensional accuracy (often within +/−20 millimeters at a 10-meter range) to the original real-world real estate property.

Lower-cost devices, such as the Insta360×4 devices, may be used when such high accuracy is unnecessary. The Insta360×4 comprises two high-resolution fisheye lens video cameras mounted opposite to each other. The cameras are configured to capture a 360-degree view of the environment. The Insta360 software is further configured to stitch the two different camera views together to produce a seamless 360-degree view of the environment and correct for distortions caused by the fisheye lens.

FIG. 3C (220) shows an Insta360×4 system as an example. In FIG. 3B, an Insta360×4 type system (220) is mounted in a stand. It is then moved to various locations inside the real-world property (100), such as the kitchen (210), and various images are obtained.

Other types of cameras, including more conventional cameras, preferably assisted by suitable image stitching software, may also be used.

In some embodiments, rather than making in-person visits to a real-world real estate property, a user may use a suitable augmented reality/virtual reality headset (150a), and a virtual copy of the real-world real estate property, and become a virtual visitor to the virtual copy of the real-world real estate property.

Here, as before, the virtual visitor (140) can move about the virtual copy of the real estate property by physical movement or by implementing various movement commands. The headset (150a) can be configured to produce output corresponding to the visitor's location in the virtual copy, as well as the orientation of the visitor relative to the virtual copy. Locations of interest on the virtual copy can be identified. The headset can also be configured to transmit suitable identification codes for at least some visitors. Thus, as per the real-world version, the system can accumulate statistics on the locations, orientations, and characteristics of the various virtual visitors for at least some of these locations of interest. This data may also be used to produce automated recommendations as well.

In FIG. 18A, user (140) with either an associated smartphone (146) and "tour app", or using a headset (150a) and a previously stored virtual copy of property (100) is now touring the inside of property (100), and in particular, is interested in the kitchen (210). Assume that the user (140), although generally liking the property (100), doesn't like the kitchen stove (204) or other appliances and wants to visualize how the kitchen would look with a different stove or other appliance. Assume also that an appliance manufacturer or other manufacturer, service provider, or vendor (214) has used their computerized device (212) previously uploaded virtual objects and virtual object appearance information for a suitable stove (216) to the server database (132).

User (140) can use their computerized device (146) and tour app or another type of app to image this region of the kitchen (206) that includes stove (204), and can also select a suitable replacement stove. The server (130) sends this stove virtual object appearance information and virtual object associated information (stove price, sizes, etc.) to the user's tour app. The user's computerized device and tour app can then allow the user to visualize how a replacement stove (or another appliance might work). The same principle can be used to virtually populate the property with a virtual staging set of furniture, visualize remodeling, visualize landscaping, and so on.

Thus, this embodiment can encourage user uploading of data by implementing a computerized method that is particularly useful for augmented reality applications. This method can comprise using a personal mobile computerized device (which can be a smartphone, such as 146) comprising at least one processor, memory, a graphical user interface, at least one wireless transceiver, and at least one location-determining device (such as a GPS device or other location-determining system as previously discussed), as well as and at least one camera to image (here image also includes video) a portion of a real estate property. This still or video image of a real estate property is termed a property image.

The method also uses the mobile computerized device (146) to receive, for a plurality of virtual objects, virtual object appearance information and virtual object associated information from at least one internet server (such as 130, here also including memory/database 132).

This internet server (130) is configured with a database (132) providing a standardized API for groups of virtual objects, virtual object appearance information, and virtual object associated information. In effect, this internet server provides a gateway that permits a plurality of vendors (here represented by vendor 214) of these virtual objects to enter each vendor's vendor associated virtual objects, virtual object appearance information, and virtual object-associated information. In FIG. 18A, one of the vendors is an appliance manufacturer that makes or stocks a variety of different stoves and has placed virtual objects corresponding to these real-world stoves on a server (130) and database (132) using the vendor's computerized device (212).

The personal mobile computerized device (smartphone 146)'s graphical user interface (or other display systems) and tour app (or other type of app) can then display, for at least some of the plurality of virtual objects, any of virtual object appearance information and virtual object associated information. The user can use their mobile computerized device, to enter a first user selection comprising at least one user selected virtual object for at least one of the pluralities of virtual objects.

The personal mobile computerized device can then use its processor and this first user selection, to combine the property image, and the at least one user selected virtual object appearance information, to produce an augmented reality property image on the graphical user interface or other display. This allows the user to see the virtual object in the context of the property image or video.

In some embodiments, the user may also use the personal mobile computerized device to enter a second user selection comprising at least one modification of this first user selection. For example, the user may alter the virtual object's color, dimensions, orientation, or other properties, and obtain an augmented reality view of these changes as well. This first and optional second user selection can then be transmitted to the internet server (130).

In some embodiments (such as if, for example, the user was then interested in obtaining the actual physical version of the virtual object), the system can then use the internet server to transmit this first user selection and optional second user selection to at least one vendor associated with those virtual objects in the first user selection, such as vendor (214) via vendor computerized device (212).

In some embodiments, automated recommendations produced by the LLM may also be used to recommend, select, or highlight at least some of these virtual objects.

FIG. 18B shows how in some embodiments, the server (130) may either further comprise an LLM server, or else, (as shown in FIG. 18B) be connected to a remote LLM server (170), to add additional intelligence to the process. In either case, this LLM will preferably comprise a specialized real estate dataset, and in a preferred embodiment, may further draw upon the system's own database of statistics (132) on how users (often in a given area, such as a given Zip code) react to designated portions of a given property.

Thus, for example, assume that server (130) and database (132) have been operating throughout multiple geographic areas (such as multiple Zip codes), and have accumulated data showing that visitors in Zip code "A" tend to spend more time touring houses painted in brighter colors and looking in kitchens equipped with gas cooktops. By contrast, the system may have also accumulated data showing that visitors in Zip code "B" tend to spend more time touring houses painted in muted colors, such as beige, and tend to spend more time looking in kitchens equipped with induction cooktops.

To make these generalizations, the system's vision recognition system may be configured to automatically recognize certain building characteristics from either user, realtor, or owner-uploaded photographs, and/or the system may invite the building's owner or realtor to supply this information ahead of time to assist the system in this analysis.

Once the statistical information is obtained and stored in database (132), in response to visitor inquiries about possible alterations to a given building, the system can offer the visitor a choice, such as "make recommendations according to comparables (comps) in this area?" If the visitor selects "no", then the system may invoke the LLM (170) in the recommendation process without supplying statistical information from (132). However, many users will have a desire to exist harmoniously with at least the better homes in their local environment and may thus select "Yes."

Say the visitor is touring a property in Zip code "B". In this latter case, then the system can send additional parameters to the LLM (170), such as the observations to emphasize muted paint colors, and induction cooktops. This, in turn, can (depending upon what options the visitor selects) be used by the LLM as a suggestion to highlight or preferentially suggest muted colors and induction cooktops for visitors in this area. In practice, a visitor could upload a kitchen photo and ask a broad question such as "show me this kitchen updated to resemble recent comps in this area". a, and the system and LLM can then work together to immediately alter the photo with the muted colors and induction cooktops (216*a*) previously seen to be correlated with visitor interest in this area. The system can also be configured so that the visitor can then decide to override these suggestions with their individual preferences as desired.

Virtual Staging:

In real estate, the term "staging" is used to describe when a property, such as a house, is shown with custom furniture specifically selected to make the house appeal to potential buyers. The process is expensive and requires that outside furniture be chosen and brought in specifically to show the property. This furniture is then typically removed after showing.

In some embodiments, these methods may also be used to "virtually stage" a real estate property by storing a preselected staging set of virtual object appearance information in the at least one internet server (130, 132). Here the virtual objects may be furniture virtual objects that can also be selected to make the property show well.

In this method, the server (130) can then transmit this preselected staging set of virtual object appearance information to a real-world visitor's mobile computerized device (146) and tour app, thus allowing the real-world visitor (146) to view an augmented reality view of this preselected staging set of virtual objects during, for example, a real-world tour of the real estate property.

Note that in some embodiments, automated recommendations produced by an LLM may be further used to recommend, select, or highlight at least some of this preselected staging set.

Here, if the user is interested in obtaining real-world versions of the virtual objects, the system can also be configured with an electronic document handling system, such as the previously described document handling system, to facilitate the process of interacting with the various entities that can provide the real-world version of the virtual objects. At the same time, user choices can also be saved, statistically aggregated, and used for various analytical purposes.

Here, as previously discussed, the internet server (130) can use previously stored information on the user (140) and the real estate property (100, 200) to automatically pre-populate at least some portions of a fillable form electronic document, thus creating pre-populated fillable form electronic documents. The server can then transmit these pre-populated fillable form-field electronic documents to the user's mobile computerized device (146) and/or other devices as desired. This can either be in the context of the previously discussed tour app, or in the context of other smartphone software as well.

This personal mobile computerized device (146) and or other devices can be further configured to securely receive this pre-populated fillable form electronic document, as well as to receive additional input from the user (140), thus creating a user-edited pre-populated fillable form electronic document. The user's device (146) can then, (using the server as an optional intermediate relay) transmit this user-edited pre-populated fillable form electronic document to an internet destination (such as 135).

In addition to providing a valuable service to the user, these methods also encourage the user to take many videos or still images of a given property during a tour. (Here video images and still images will be used interchangeably, since video is simply a sequence of individual images).

To generalize, the visitor obtained images are obtained from any of an electronic still camera, video camera, or even a LIDAR imaging device onboard the visitor's user-assigned personal mobile computerized device. Thus, the term "camera", "video-camera", "video", "images" or "video-images" may be obtained from any of the above devices.

These "visitor video" (or still) images can also be highly useful for more precisely determining the user/visitor's position and/or orientation during a tour as well. Put alternatively, in some embodiments, these visitor-obtained images may be used to determine distances between the visitors and various designated locations of interest. This in turn allows the system to calculate the position and/or orientation of the visitors with respect to at least some of these designated locations of interest.

In some embodiments, this can be done by using the visitor obtained-images. In these embodiments, it will be useful first to use a reference camera (which itself can be a smartphone) equipped with a suitable position and orientation determining sensor to obtain reference images of these various locations of interest. These reference images can be stored, along with the locations and orientations of the reference camera while these reference images were obtained, in a "location of interest reference database," This often may be a database (such as 132) accessible by a server such as (130).

These reference images can be obtained, for example, by having someone walk through a property (preferably in advance of the various tours), photographing the various locations of interest using a smartphone (or another device) equipped with position and/or orientation reference image annotation software. These position and/or orientation annotated reference images can then be uploaded to the location of interest reference database. Although it will often be preferable to do this in advance of a tour, there is no actual requirement to do this in advance. Indeed, this information may be retrieved from older visitor video images by comparing these visitor video images to reference images obtained after these earlier tours.

The same visitor video images used for virtual staging and/or other virtual object purposes can then also be used to more precisely determine the location and orientation of the visitors (at least when the visitors took these visitor video images. To do this, the system (which can again be implemented on server 130 and database 132, or other processor/memory device) can use image recognition software to compare the visitor video images with the position and/or orientation annotated reference images. The probable distance and angle offsets between the visitor video camera and the reference camera can be computed. This allows the probable location of the visitor camera, at the time the visitor image was obtained, to be calculated with high precision using standard trigonometry angle offset calculations.

In some embodiments, the statistics on locations and/or orientations and characteristics of the various visitors with respect to at least some locations of interest can be further used for any of A/B testing and multivariate testing. For example, this can be A/B Testing, multivariate testing.

Topics of this testing can include colors, floor layouts, furniture staging, selection, and ranking of appliances as to good, better & best, and other applications.

The system can also be used for various layouts and floor plan optimizations, showing and evaluating various houses and apartments. Multiple fixtures and colors, and at different price points, can be quickly shown and evaluated.

Further Discussion

Additional Metrics and Algorithms:

Prospect Qualification Score: Can include factors such as credit (ability to pay), and a scoring function or algorithm based on the potential client's use level such as the time spent touring a given property, geo-tagged property information requests/hits, interactions via video chat, number of visits to the Property, number of questions asked & answered, and (where permitted (tracking of the potential client, such as by face (or portions of the face such as the ear), tracking, client computerized device tracking, and the like.

As previously discussed, the system may use the sensor data to determine a path or route that a single user, or a small group of users, may take on a tour, as is shown in FIGS. 19A, 19B, and 19C.

FIGS. 19A, B, and C show the route that a single prospect user has taken through various properties. FIG. 19A, shows the route that a single prospect user took on a first floor of a residential property, FIG. 19B shows the route that a single prospect user took on a second floor of a residential property, and FIG. 19C shows route that a single prospect user took on a floor of a commercial property (here an office building).

The system can be configured to capture this data on the individual user level, and also can be configured to combine the data of multiple prospect users over multiple tours to show the aggregate routes taken, as will be discussed below.

The system may also combine the values produced by many users (visitors, prospect-users, etc.) to visually show statistical data that summarizes the various paths and rooms or areas visited over many different tours. This statistical data may be shown in various alternative formats.

In one alternative format, the system can also generate heat maps, or other graphical representations of data, where data values can be represented visually that can include time(s) spent by users on a per room basis, user, traffic flows, specific property addresses, models, or apartments toured by many visitors to a given property. Examples of such "heat map" type graphical representation of data, for both residential and commercial property, are shown in FIGS. 20, B, and C.

FIG. 20A shows a heat map showing areas most traveled by a plurality of visitors (such as prospect users) to a first floor of a residential real estate property.

FIG. 20B shows a heat map showing areas most traveled by a plurality of visitors (such as prospect users) to a second floor of a residential real estate property.

FIG. 20C shows heat map showing areas most traveled by a plurality of visitors (such as prospect users) to a second floor of a commercial real estate property, here a floor of an office building.

The system can also report tours on a per-user and/or per time-period basis. Other algorithms may report on the return on investment (ROI) by property address, model number, apartment/configuration, appliances, and offers.

In Conclusion, the Invention Offers the Following Features and Benefits

Improved Site Security

The invention offers security for both the prospect and the real estate owner and/or real estate broker that is abysmally absent in the person-to-person real estate tours. Specifically, for prospects to use the invention they have to offer their verified contact information. This can easily be done through the capture by scanning of an official government ID such as a driver's license.

Furthermore, the owner or real estate broker may optionally insist upon the prospect's photo which is easily captured by the end-user facing, prospect application. This photo can then readily be compared to who presents themselves to the secured entrance of the property. This secured entrance avails itself of commonly available technology such as CCTV and doorbell cameras. These can easily be monitored to make sure that the prospect is actually the same person that tours the property. With this technology, the would-be thief or vandal can easily be tracked down by the authorities.

Improved Physical Security

In recent years there have been attacks, sexual assaults and even murders of real estate brokers. The invention easily prevents that because the owner and/or real estate broker actually performs their functions remotely. Instead of physically being there, they use video chat abilities to narrate the tour for the prospect. They can explain the features and benefits of the property and answer any of the prospect's questions from their own, owner/broker facing application.

Also, and importantly, during the tour the prospect touring the facility can enjoy enhanced security. Through the they may engage a panic button should there be a health emergency or security issue. Once activated, the owner and/or broker the notified and can engage with the prospect, and/or the proper authorities can be notified.

Improved Time-Efficiency

Significantly, this invention greatly enhances the owner and/or their real estate broker's efficiency. Instead of wasting time traveling from appointment they may easily be able to handle 5 to 10 times the number of appointments they would normally do the old and unnecessary, in-person, way.

Easier Tour Scheduling

The invention allows the prospect to book their property tour through its calendar/scheduling system. The owner and/or their real estate brokers can easily accept or decline these requests and otherwise, coordinate appointments and in fact, handle multiples more appointments per day.

This is also extremely convenient for the prospect. They can make an appointment to see the property on their schedule. This may be before or after normal business hours.

Faster and More Streamlined Real Estate Transactions

For both the owner and the real estate broker this invention can greatly increase the velocity of transactions because there are able to handle many times more prospects touring their properties. Consequently, they can have that many more prospects vying for their properties.

Furthermore, the invention allows prospect to make a bid for the purchase or lease of the property during or after the tour. The owner or lessor of the property and/or their real estate broker may instantaneously accept that bid (offer) or offer up a counter bid. This cycle can be repeated as long as both sides are willing.

Upon mutual agreement to proceed with either the purchase or lease of the property, the contract for sale or lease can be submitted electronically and instantaneously to the prospect. The prospect can then accept this contract or lease or suggest their modifications. Once again, the owner or lessor can decide to accept these changes or continue to negotiate with the prospect on the contract or lease.

If the parties reached agreement on the contract or lease, this document can be digitally signed by both parties. Any fees, payments, or deposits may then be electronically transmitted between the parties. Thus, employing the rapid submission of documents and facilitating any negotiations electronically will also increase the velocity of transactions.

Utilizes Present and Next-Generation Broadband Technology

The invention embraces powerful and existing technologies such as the ubiquitous use of inexpensive, high-speed broadband Internet and fast cellular technology. Such technologies as Wi-Fi 5, Wi-Fi 6, LTE and 5G technology offer broadband speeds of up to 1 Gb and beyond. Both wired and Wi-Fi enabled CCTV are now also ubiquitous and inexpensive. They need but a fraction of that bandwidth to perform well. This enabling technology will only get faster in years to come, yet, without this invention, real estate tours were stuck in the days of the horse and buggy.

Compatibility with Existing Digital Lock Technology

Digital door locks are also now ubiquitous. Any hardware store offers a variety of choices. The more advanced ones allow user to send a one time, unique and secure digital access code to ⅓ party. Invention embraces this technology Inc. and its application. Once the prospects ID has been accepted, then their cell phones or tablet's IMEI number is captured for security. Thereafter, once they have secured an appointment to tour the property, they are automatically issued this one-time access code for the prospect facing, and user application. Upon coming to the entrance of the property, the application allows them to use this code to open the door lock.

Furthermore, these same locks can assure that the doors are re-locked after the tour is over. If there should be an issue of re-locking the doors then the owner and/or their broker can be notified and a person can then be sent to the property to investigate the issue and secure the property.

Improved Marketing Intelligence

In the words of the famous management consultant, Peter Drucker, "You can't manage what you can't measure."

The invention tracks when the property was accessed via when this door lock was opened for it logs the date and time, IMEI number and therefore the prospect's identification.

As the prospect begins the tour, optional, the recommended CCTV cameras captured their progress. This provides many significant benefits, not the least of which is security for the property, but also security for the prospect. Additionally, the owner and/or their broker can now have access to scientific data on how much time the prospects spent touring and investigating different elements of the property. This data can be highly granular and can give the owner and/or their broker critical intelligence on what features of a property are worth investing money into and that pay the highest Return on Investment (ROI). A good example of this is a combination of kitchen amenities. Which appliances are most valued by prospective purchasers or tenants? What room layouts offer the best ROI and the list of possible money-making metrics that can be derived from this is almost infinite.

Invention allows the owner and real estate broker to gather critical, real-time metrics, such as how many tours were conducted over a period of time. How long did the prospect spend touring the particular property? This information can be further aggregated and analyzed to see the amount time for the average prospect tour. What is the conversion ratio of prospect for to selling or leasing a property? These important metrics simply unavailable the current system which frankly goes back to the beginning of time.

Improved Geo-Tagged Information for Prospects

While touring the property prospect is presented geo-tag information. The technology for this geo-tagging is readily available today. Such technologies as iBeacon, RFID, Tiles, Apple's Air Tags can inexpensively identify a person's location within the property. The invention exploits these technologies fully and will present a plethora of information such as floor plans, prerecorded videos, audio, spreadsheets, PDF files, pictures, etc. These are just some examples, any information can be digitized, can be presented to the prospect through their mobile device using the invention.

Additionally, when a prospect gets to a certain geo-tagged point, the owner and/or their real estate broker may choose to have a video or audio chat with the prospect. Of course, the prospect can request this at any point during the tour have their questions immediately answered. These answers can be given by a human owner and/or their real estate broker in real time, OR they can be provided by the invention's artificial intelligence module, having pre-reported responses to the typical and repetitive questions. This artificial intelligence aspect of the invention further takes out the drudgery of showing a property for the real estate broker and/or the owner of the property. For sure, a significant amount of their time is taken up by answering the same questions over and over again though from different prospects for the property. It is estimated by the inventor that this might save the owner and/or real estate broker upwards of 90% of the time involved with personal, one-on-one tours. Thus, greatly enhances the time efficiency for the owner and/or real estate broker. This time efficiency course translates to increase income and the reduction of frustrations.

Increased Understanding of Property Options Through Augmented Reality Techniques The prospect can easily see fixtures and furniture superimposed over their current view of the property. This can be tied into vendors for such products. For example, companies such as Ikea, Amazon, Costco, Furnitureland South could present furniture. Appliances and fixtures could be presented by companies like Lowes, Home Depot, Amazon.

In fact, using the invention and owner and/or their broker can actually provide virtual staging of furniture and fixtures. The system can superimpose the image of new furniture and fixtures over the images of the existing property.

Work estimates can be provided by vendors who are tied into the vendor portion of the application. Even real estate-related professions such as property inspectors, real estate attorneys, insurance brokers, mortgage brokers, banks, title companies, etc., can be present their offerings through this invention. This provides a significant income stream to the vendors and makes it as easy as clicking on a button for the prospect to get a quote, engage a service provider and perhaps even purchase related goods or services.

Further Discussion of LLM Methods

It is anticipated that for maximum utility, in addition to standardized general-purpose training, the LLM may also be trained with additional facts and statistics that are relevant for real estate applications. This can be done by several methods, including:

Fine-tuning: LLM that has been pre-trained on a large, general-purpose dataset is further trained on a smaller, specialized dataset relevant to real estate. This helps the LLM to learn the specific vocabulary, grammar, and patterns relevant to real estate.

This specialized data set can include:
Real estate listings (any of home and commercial)
Real estate articles (any of home and commercial)
Real estate contracts (any of home and commercial)
Real estate laws (any of home and commercial)
Real estate websites (any of home and commercial)
Real estate software-source code for various types of home or commercial real estate design and evaluation software may be used.

This can also include material relevant to building (home or commercial) renovation such as:
Home or commercial renovation and landscaping blogs
Home or commercial renovation landscaping articles
Home or commercial renovation and landscaping forums.
Home or commercial renovation websites (e.g., Angie's list, Instagram, Home Depot, Lowes, etc.)
Home or commercial renovation and landscaping software Here, specialized LLM training frameworks, such as OpenAI's GPT-3 and Google's Megatron-Turing NLG, may be used.

In some embodiments, the LLM (170) may be further trained with the not generally available data produced by the system, such as data from the server (130) and database (132). This approach allows the LLM (170) to supplement the output from the server (130) and database (132) to answer user questions that might not have been previously anticipated. In other words, in some embodiments, the LLM be further configured to use the invention's often proprietary data, obtained from monitoring real-world visitor interactions with real-world property, to obtain valuable insights that might not otherwise be possible.

Data augmentation: This approach involves artificially expanding the specialized dataset by creating new data points similar to the existing data points. This can be done by applying transformations, such as synonym replacement, paraphrase generation, and sentence reordering.

Multi-task learning: This approach involves training the LLM on multiple tasks related to the real estate domain. This helps the LLM learn the common underlying concepts in the different tasks, which can improve its performance on all tasks.

AI Recommendations for Furniture, Appliances & Renovations

In some embodiments, the AI/LLM system can also be configured to consider the lifespan of things like the roof, HVAC system, appliances, and carpets and then make informed recommendations on what it will take to bring an old property up to present standards. Here, as before, the system can be configured to either query the property owner/realtor in advance about this information or alternatively attempt to automatically deduce ages by automatically reviewing the building permit history for that property.

In some embodiments, the AI system may also recommend appliances, contractors, types of HVAC systems, types of roofs, and the benefits and negatives of specific suggestions. The AI system can also provide estimated pricing & typical times to complete. These estimations can be based on the cost per hour by zip code for the various trades, as well as typical costs for the recommended equipment, materials, and appliances. In some embodiments, the system can also be configured to show advertisements in this context, although generally, it will be preferable to label the advertisements as such.

As previously discussed, the AI/LLM system can also be configured to recommend colors, landscaping, and paint. This can be based on data on what is popular in that particular area, or other criteria. For example, if the visitors provide demographic information into the system, other visitors can ask for AI/LLM preferences matching certain demographics.

Sanity Checking and Quality Control

Note that in some embodiments, both the system server (130) and database (132) and the LLM system (170) may at least some similar or related information. This redundancy is useful, particularly because LLM often tend to "hallucinate" or "makeup" data. Thus, in some embodiments, the system may be configured to conduct a "sanity check," in which LLM-generated suggestions from the LLM server (170) are confirmed or checked against the system's other databases (130, 132). The system can then be configured to prioritize those LLM suggestions from (170) that pass the "sanity checks" imposed by the server (130) and database (132). Alternatively, the two sections can conduct a prompt-style dialog, such as:

LLM server (170) makes an initial suggestion

System server and database (130, 132) check the plausibility of this initial suggestion and generate an additional feedback prompt to the LLM server, such as "this suggestion appears to be unpopular here" (if the LLM suggestion can't be confirmed).

The LLM server (170) can then use this feedback prompt to modify its initial suggestion.

The system can be configured to perform this process of LLM proposal and real-world database sanity-checking multiple times, as desired, to improve the quality of the system suggestions.

FIG. 21A shows how in some embodiments, a visitor/user can upload a photo of a real-world visited house into the system (often to server 130, but sometimes directly to the LLM server (170)) and then ask the system to visualize how the house might look if remodeled according to statistical data corresponding to the real-world preferences of other visitors and other houses in a given area.

Here assume that the dialog between a given visitor or user and the LLM system is something like:

User Input to LLM system> Photos of the house [This house photo shows neglected landscaping with an older-style walkway and overgrown bushes. The house has an older-style entryway, roof lines, front door, and windows.

User Input to LLM system> My wife thinks that this look is dated. What would the house look like if we make it look like some of the better houses in our area?

Here assume that the statistical database (132) shows that other visitors in areas similar to this house's Zip code that visited houses that recently sold above market spent significantly more time looking at houses with updated landscaping, updated entryways, roof lines, front doors, and updated windows. The LLM (170) can use its neural network to pull up suggestions of recent landscaping designs, entryway trends, roof lines, front doors, and windows and give the visitor/user an AI-reimaged version of the original photo with the above changes. This can then be sent to the user's handheld computerized device (smartphone or tablet) or other output device.

FIG. 21B shows how the LLM system can use statistics (132) accumulated from multiple visitors and various user prompts, such as input photographs of a house and a prompt to show what the house would look like if upgraded according to statistics of local visitor preferences, to reprocess this house photo according to these local visitor preferences. The system can also be configured to accept other prompts, such as prompts to ignore visitor preferences, pick visitor preferences from certain classes of visitors, override with the user's own preferences, and so on.

In some embodiments, the user can submit additional queries such as:

User Input to LLM> How much would these changes cost?

In response to this prompt, the LLM neural net selects from the training set showing contractor prices for such modifications and in turn can produce a list of major costs and total prices.

This system then allows a visitor to reimagine the house according to various parameters, see what this would look like, and also get an estimate of what various changes would cost.

Further Applications of the Systems and Methods Discussed Herein can Include:

Facial Recognition and Behavior Analysis: AI-driven facial recognition can identify and authenticate visitors. AI can analyze video feeds to understand visitor engagement and interest levels, helping sellers focus on key selling points.

Personalized Recommendations: AI can analyze user preferences and behavior to provide personalized property recommendations.

Interactive Features: Buyers can interact with virtual elements such as opening doors, turning on lights, or moving furniture to get a better feel for the property. Enhanced visualization tools can help buyers see different configurations or renovations in real-time.

Enhanced Decision Making: Access to detailed property information and the ability to visualize changes can help buyers make more informed decisions.

Scheduling Optimization: AI can help users schedule tours based on their availability, avoiding conflicts.

Automated Marketing: AI can automate marketing campaigns, targeting the right audience with personalized ads.

Fraud Detection: AI can monitor transactions to detect and prevent fraudulent activities.

Data-Driven Insights: AI analytics can provide brokers with insights into client preferences, market trends, and property performance.

Targeted Marketing: AI algorithms can help brokers create targeted marketing campaigns.

Facial Recognition: Identify and authenticate visitors for enhanced security and personalized experiences.

Behavior Analysis: Understand visitor engagement and interest levels to optimize the tour experience.

The invention claimed is:

1. A method comprising:
using at least one real-world real estate property (real estate property) and at least one internet-connected sensor comprising at least one camera to automatically monitor activities of a plurality of visitors to any of said at least one real estate property and virtual copies of said at least one real estate property, and automatically report said activities of said plurality of visitors to at least one internet server;

each said visitor being a human real-world or virtual visitor with a field of view;

at least some of said visitors carrying user-assigned personal mobile computerized devices (personal mobile computerized devices) that wirelessly transmit unique identification codes that can be traced to specific visitors and specific visitor characteristics;

said at least one real estate property having designated locations of interest;

each said visitor having at least an orientation corresponding to said visitor's field of view;

using at least one processor, images from said at least one camera, and any of automated vision software and AI image recognition software to automatically determine, as a function of time, distances between said visitors and said designated locations of interest, and/or orientation of said visitors with respect to at least some said designated locations of interest;

automatically receiving said wirelessly transmitted unique identification codes, and determining said specific visitor characteristics for at least some said visitors;

automatically accumulating, over a plurality of said visitors, statistics on locations and/or orientations and characteristics of said visitors with respect to at least some said locations of interest; and using said statistics, and at least one computerized AI, generative AI or—Large Language Model (LLM), to produce automated recommendations regarding any real estate property.

2. The method of claim 1, wherein said automated recommendations include any of said AI, generative AI or LLM generated proposals or images giving at least some AI, generative AI or LLM recommended changes to said any real estate property.

3. The method of claim 1, further automatically determining, for at least some said visitor characteristics, if at least some locations of interest correlate with statistically higher or lower distances and/or orientations between at least some said visitor characteristics and at least some said designated locations of interest;

wherein said server uses previous determinations of statistically higher or lower distances and/or orientations between at least some said visitor characteristics and at least some said designated locations of interest to automatically transmit questions or feedback options to visitors carrying user-assigned personal mobile computerized devices either during or after said visitor conducts a tour of said at least one real estate property; and and using said server to receive answers to said questions or feedback options, and further correlate at least said determinations of statistically higher or lower distances and/or orientations between at least some said visitor characteristics and at least some said designated locations of interest with said answers or feedback options.

4. The method of claim 1, wherein at least some of said personal mobile computerized devices comprise 3D virtual or augmented reality headsets comprising said at least one internet-connected sensor.

5. The method of claim 1, further producing virtual copies of said at least one real estate property by using at least one camera to produce a plurality of images of said at least one real estate property, and using at least some of said plurality of images to produce at least one virtual copy of said at least one real estate property.

6. The method of claim 1, wherein said least one real-world real estate property is a plurality of real estate properties, further using said at least one processor to display said locations and/or orientations and characteristics of said visitors with respect to at least some said locations of interest in real time, over at least some of said plurality of real estate properties, on a dashboard type graphical user interface.

7. The method of claim 1, wherein said at least one real-world real estate property is configured with at least one internet-connected sensor, thus providing at least one property associated internet-connected sensor;

said at least one property associated internet-connected sensor comprising at least one camera;

said at least one property associated internet-connected sensor is configured to cover at least one said designated location of interest;

wherein said at least one processor uses data from said at least one property associated internet-connected sensor, and any of automated vision software and AI image recognition software, to at least partially and automatically determine, as a function of time, distances between said visitors and said designated locations of interest, and/or orientation of said visitors with respect to at least some said designated locations of interest.

8. The method of claim 1, wherein at least some of said at least one internet-connected sensors are associated with at least some of said user-assigned personal mobile computerized devices, thus providing at least one mobile device associated internet-connected sensor;

said at least one mobile device associated internet-connected sensor being carried by said visitors so as to at least occasionally cover at least one said designated location of interest;

wherein said at least one processor uses data from said at least one mobile device associated internet-connected sensor to at least partially determine, as a function of time, distances between said visitors and said designated locations of interest, and/or orientation of said visitors with respect to at least some said designated locations of interest;

wherein said personal mobile computerized device comprises at least one processor, memory, a graphical user interface, at least one wireless transceiver, and at least one location-determining device, at least one orientation determining device, and at least one camera;

using said at least one camera to image a portion of said at least one real estate property, thus creating a property image;

further virtually staging said at least one real estate property by storing a preselected staging set of virtual object appearance information in said at least one internet server; and using said server to transmit said preselected staging set of virtual object appearance information to a real-world visitor's personal mobile computerized device, thus allowing said real-world visitor to view an augmented reality view comprising a combination of said property images and said preselected staging set of virtual objects during a real-world tour of said at least one real estate property;

and using any of said property images, data from said at least one location-determining device, and/or data from said at least one orientation determining device to determine distances between said visitors and said designated locations of interest, and/or orientation of said visitors with respect to at least some said designated locations of interest.

9. The method of claim 8, further using said automated recommendations produced by said at least one AI, generative AI, or LLM to recommend, select, or highlight at least some of said preselected staging set.

10. The method of claim 1, wherein at least some of said at least one internet-connected sensors are associated with at least some of said user-assigned personal mobile computerized devices, thus providing at least one mobile device associated internet-connected sensor;

said at least one mobile device associated internet-connected sensor being carried by said visitors so as to at least occasionally cover at least one said designated location of interest;

wherein said at least one processor uses data from said at least one mobile device associated internet-connected sensor to at least partially determine, as a function of time, distances between said visitors and said designated locations of interest, and/or orientation of said visitors with respect to at least some said designated locations of interest;

wherein said personal mobile computerized device comprises at least one processor, memory, a graphical user interface, at least one wireless transceiver, and at least one location-determining device, at least one orientation determining device, and at least one camera;

using said at least one camera to image a portion of said at least one real estate property, thus creating a property image;

using said mobile computerized device to receive, for a plurality of virtual objects, virtual object appearance information and virtual object associated information from at least one internet server;

wherein said internet server is configured with a database providing a standardized API for group of virtual objects, virtual object appearance information, and virtual object associated information, and said internet server provides a gateway permitting plurality of vendors of said virtual objects to enter each vendor's vendor associated virtual objects, virtual object appearance information, and virtual object associated information;

displaying for at least some of said plurality of virtual objects, any of virtual object appearance information and virtual object associated information on said graphical user interface;

receiving, using said personal mobile computerized device, a first user selection comprising at least one user selected virtual object for at least one of said plurality of virtual objects, and for said first user selection, using said processor to combine said property image and at least one user selected virtual object appearance information to produce an augmented reality property image on said graphical user interface;

receiving, using said personal mobile computerized device, a second user selection comprising at least one modification of said first user selection; and using said internet server to transmit said first user selection and said second user selection to at least one vendor associated with those virtual objects in said first user selection;

and using any of said property images, data from said at least one location-determining device, and data from said at least one orientation determining device to determine distances between said visitors and said designated locations of interest, and/or orientation of said visitors with respect to at least some said designated locations of interest.

11. The method of claim 10, further using said automated recommendations produced by said at least one AI, generative AI, or LLM to recommend, select, or highlight at least some of said plurality of virtual objects.

12. The method of claim 1, wherein at least some of said at least one internet-connected sensors are associated with at least some of said user-assigned personal mobile computerized devices, thus providing at least one mobile device associated internet-connected sensor;

said at least one mobile device associated internet-connected sensor being carried by said visitors so as to at least occasionally cover at least one said designated location of interest;

wherein said at least one processor uses data from said at least one mobile device associated internet-connected sensor to at least partially determine, as a function of time, distances between said visitors and said designated locations of interest, and/or orientation of said visitors with respect to at least some said designated locations of interest;

wherein said least one mobile device associated internet-connected sensor is a camera device;

at least partially determining, as a function of time, distances between said visitors and said designated locations of interest, and/or orientation of said visitors with respect to at least some said designated locations of interest by the steps of:

a: using a reference camera device to obtain reference images of said least one said designated location of interest, and storing said reference images, along with the locations and orientations of said reference camera device while said reference images were obtained, in a server location of interest reference database;

b: using said at least one mobile device associated internet-connected sensor to obtain visitor images of said designated locations of interest;

c: using at least one processor, and image recognition software, to compare said reference images with said visitor images, and calculating a position and/or orientation of said least one mobile device associated internet-connected sensor at the time said visitor images were obtained.

13. A system comprising:

at least one internet server configured to use at least one real-world real estate property (real estate property) and at least one internet-connected sensor comprising at least one camera to automatically monitor activities of a plurality of visitors to any of said at least one real estate property and virtual copies of said at least one real estate property, and automatically report said activities of said plurality of visitors;

each said visitor being a human real-world or virtual visitor with a field of view;

at least some of said visitors equipped with personal mobile computerized devices configured to wirelessly transmit unique identification codes that can be traced to specific visitors and specific visitor characteristics;

said at least one real estate property having designated locations of interest;

each said visitor having at least an orientation corresponding to said visitor's field of view;

said at least one internet-connected sensor configured to observe at least one said designated location of interest;

any of automated vision software and AI image recognition software, and at least one processor on any of said internet server or other computerized device configured to determine, as a function of time, distances between said visitors and said designated locations of interest, and/or orientation of said visitors with respect to at least some said designated locations of interest;

said at least one internet server configured to receive said wirelessly transmitted unique identification codes, and to determine said specific visitor characteristics for at least some said visitors;

said at least one internet server further configured to accumulate, over a plurality of said visitors, statistics on locations and/or orientations and characteristics of said visitors with respect to at least some said locations of interest;

said system further comprising at least one AI, generative AI, or computerized Large Language Model (LLM) system configured to use said statistics to produce automated recommendations regarding any real estate property.

14. The system of claim 13, wherein said automated recommendations include any of said AI, generative AI, or LLM generated proposals or images giving at least some AI, generative AI, or LLM recommended changes to said any real estate property.

15. The system of claim 13, wherein said at least one real-world real estate property is configured with at least one internet-connected sensor, thus providing at least one property associated internet-connected sensor;

said at least one property associated internet-connected sensor comprising at least one camera;

said at least one property associated internet-connected sensor is configured to cover at least one said designated location of interest;

wherein said at least one processor uses data from said at least one property associated internet-connected sensor, and any of automated vision software and AI image recognition software, to at least partially and automatically determine, as a function of time, distances between said visitors and said designated locations of interest, and/or orientation of said visitors with respect to at least some said designated locations of interest.

16. The system of claim 13, wherein at least some of said at least one internet-connected sensors are associated with at least some of said personal mobile computerized devices, thus providing at least one mobile device associated internet-connected sensor;

said at least one mobile device associated internet-connected sensor being carried by said visitors to at least occasionally cover at least one said designated location of interest;

wherein said at least one processor uses data from said at least one mobile device associated internet-connected sensor to at least partially determine, as a function of time, distances between said visitors and said designated locations of interest, and/or orientation of said visitors with respect to at least some said designated locations of interest;

wherein said personal mobile computerized device comprises at least one processor, memory, a graphical user interface, at least one wireless transceiver, and at least one location-determining device, at least one orientation determining device, and at least one camera;

said personal mobile computerized device configured to use said at least one camera to image a portion of said at least one real estate property, thus creating a property image;

said at least one internet server further configured to virtually stage said at least one real estate property with a preselected staging set of virtual object appearance; and said at least one internet server configured to transmit said preselected staging set of virtual object appearance information to a real-world visitor's personal mobile computerized device;

said personal mobile computerized device configured to display an augmented reality view comprising a combination of said property images and said preselected staging set of virtual objects during a real-world tour of said at least one real estate property;

said at least one internet server configured to use any of said property images, data from said at least one location-determining device, and/or data from said at least one orientation determining device to determine distances between said visitors and said designated locations of interest, and/or orientation of said visitors with respect to at least some said designated locations of interest.

17. The system of claim 16, wherein said at least one internet server is further configured to use said automated recommendations produced by at least one said AI, generative AI, or LLM to recommend, select, or highlight at least some of said preselected staging set.

18. The system of claim 13, wherein at least some of said personal mobile computerized devices comprise 3D virtual or augmented reality headsets comprising said at least one internet-connected sensor.

19. The system of claim 18, wherein said at least one processor is configured to load said virtual copies of said at least one real estate property into said headset by downloading at least some images of said at least one real estate property from said at least one internet server.

20. The system of claim 13, wherein at least some of said at least one internet-connected sensors are associated with at least some of said personal mobile computerized devices, thus providing at least one mobile device associated internet-connected sensor;

said at least one mobile device associated internet-connected sensor being carried by said visitors so as to at least occasionally cover at least one said designated location of interest;

wherein said at least one processor uses data from said at least one mobile device associated internet-connected sensor to at least partially determine, as a function of time, distances between said visitors and said designated locations of interest, and/or orientation of said visitors with respect to at least some said designated locations of interest;

wherein said at least one mobile device associated internet-connected sensor is a camera device;

a: said internet server comprising a server location of interest reference database comprising reference images of said at least one said designated location of interest, along with the locations and orientations of a reference camera device that produced said reference images, while said reference images were obtained;

b: said server further comprising visitor images of said designated locations of interest produced by using said at least one mobile device associated internet-connected sensor;

c: said server further configured to use at least one processor, and image recognition software, to compare said reference images with said visitor images, and calculate a position and/or orientation of said least one mobile device associated internet-connected sensor at the time said visitor images were obtained.

* * * * *